(12) United States Patent
Bi et al.

(10) Patent No.: US 11,979,228 B2
(45) Date of Patent: May 7, 2024

(54) SIGNAL TRANSMISSION METHOD AND COMMUNICATIONS APPARATUS

(71) Applicant: HUAWEI TECHNOLOGIES CO., LTD., Shenzhen (CN)

(72) Inventors: Wenping Bi, Shenzhen (CN); Yue Zhao, Beijing (CN); Hong Wang, Beijing (CN); Xinqian Xie, Beijing (CN); Zheng Yu, Beijing (CN); Xingqing Cheng, Beijing (CN); Xiang Mi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 512 days.

(21) Appl. No.: 17/214,516

(22) Filed: Mar. 26, 2021

(65) Prior Publication Data

US 2021/0218495 A1   Jul. 15, 2021

Related U.S. Application Data

(63) Continuation of application No. PCT/CN2019/080641, filed on Mar. 29, 2019.

(30) Foreign Application Priority Data

Sep. 28, 2018   (WO) ................ PCT/CN2018/108484

(51) Int. Cl.
*H04L 1/00*   (2006.01)
*H04L 1/1867*   (2023.01)
(Continued)

(52) U.S. Cl.
CPC .......... *H04L 1/0025* (2013.01); *H04L 1/1896* (2013.01); *H04W 72/0466* (2013.01); *H04W 72/23* (2023.01); *H04W 76/11* (2018.02)

(58) Field of Classification Search
CPC .... H04L 1/0025; H04L 1/1896; H04W 76/11; H04W 72/23; H04W 72/0466
See application file for complete search history.

(56) References Cited

U.S. PATENT DOCUMENTS

| 2018/0139774 A1 | 5/2018 | Ma et al. |
| 2018/0176945 A1* | 6/2018 | Cao ...................... H04L 5/0044 |

(Continued)

FOREIGN PATENT DOCUMENTS

| CN | 101990236 A | 3/2011 |
| CN | 102282779 A | 12/2011 |

(Continued)

OTHER PUBLICATIONS

R1-1808100 Huawei "Enhanced UL configured grant transmissions" 3GPP WG1 #94 Gothenburg Aug. 20-24, 2018 (Year: 2018).*

(Continued)

*Primary Examiner* — Basil Ma
(74) *Attorney, Agent, or Firm* — Leydig, Voit & Mayer, Ltd.

(57) ABSTRACT

Embodiments of this application provide a signal transmission method and a communications apparatus. The method includes: a terminal device receives information from a network device, wherein the information indicates the terminal device to send a signal in a fallback transmission mode; the terminal device determines that transmission of the signal is failed; and then sends the signal to the network device in the fallback transmission mode.

20 Claims, 4 Drawing Sheets

(51) Int. Cl.
*H04W 72/044* (2023.01)
*H04W 72/23* (2023.01)
*H04W 76/11* (2018.01)

(56) References Cited

U.S. PATENT DOCUMENTS

| | | | |
|---|---|---|---|
| 2018/0278373 A1 | 9/2018 | Wang et al. | |
| 2019/0349146 A1 | 11/2019 | Wu et al. | |
| 2021/0259013 A1* | 8/2021 | Wong | H04W 74/008 |

FOREIGN PATENT DOCUMENTS

| | | |
|---|---|---|
| CN | 107734651 A | 2/2018 |
| CN | 107888340 A | 4/2018 |
| CN | 108076529 A | 5/2018 |
| CN | 108365925 A | 8/2018 |
| CN | 108370546 A | 8/2018 |
| CN | 108513714 A | 9/2018 |
| CN | 108029136 B | 1/2021 |
| EP | 2144473 A2 | 1/2010 |
| EP | 3541135 A1 | 9/2019 |
| EP | 3553986 A1 | 10/2019 |
| WO | 2018003875 A3 | 3/2018 |
| WO | 2018086535 A1 | 5/2018 |
| WO | 2018087124 A1 | 5/2018 |
| WO | 2018103100 A1 | 6/2018 |
| WO | 2018107944 A1 | 6/2018 |
| WO | 2018137664 A1 | 8/2018 |
| WO | 2018141281 A1 | 8/2018 |

OTHER PUBLICATIONS

"Discussion on Msg3 fallback in EDT," [online] 3GPP TSG-RAN WG2 Meeting #103, Gothenburg, Sweden, R2-1811821, Total 4 pages, 3rd Generation Partnership Project, Valbonne, France (Aug. 20-24, 2018).

"Summary of remaining issues on DCI contents and formats," 3GPP TSG RAN WG1 Ad Hoc Meeting, Vancouver, Canada, R1-1800070, Total 6 pages, 3rd Generation Partnership Project, Valbonne, France (Jan. 22-26, 2018).

"Enhanced UL configured grant transmissions," 3GPP TSG RAN WG1 Meeting #94, Gothenburg, Sweden, R1-1808100, Total 6 pages, 3rd Generation Partnership Project, Valbonne, France (Aug. 20-24, 2018).

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.8.0, total 140 pages, 3rd Generation Partnership Project, Valbonne, France (Jun. 2018).

Huawei, HiSilicon, "Feature lead summary of Support for transmission in preconfigured UL resources," 3GPP TSG RAN WG1 Meeting #94, Gothenburg, Sweden, R1-1809571, total 11 pages, 3rd Generation Partnership Project, Valbonne, France (Aug. 20-24, 2018).

* cited by examiner

SIGNAL TRANSMISSION METHOD AND COMMUNICATIONS APPARATUS

CROSS-REFERENCE TO RELATED APPLICATIONS

This application is a continuation of International Application No. PCT/CN2019/080641, filed on Mar. 29, 2019, which claims priority to International Application No. PCT/CN2018/108484, filed on Sep. 28, 2018. The disclosures of the aforementioned applications are hereby incorporated by reference in their entireties.

TECHNICAL FIELD

Embodiments of this application relate to the field of mobile communications technologies, and in particular, to a signal transmission method and a communications apparatus.

BACKGROUND

Currently, a long term evolution-advanced (LTE-A) system and derivative systems thereof, such as an enhanced machine type communication (eMTC) system and an additional machine type communication (AMTC) system, become mainstream communications systems. In a communication process based on LTE-A and a derivative system of LTE-A, a terminal device may send an uplink signal to a network device in a grant-free (GF) mode.

Usually, a status of the terminal device includes a connected state, an inactive state, an idle state, and the like. In the connected state, a radio resource control (RRC) connection is established between the terminal device and the network device. In the idle state, there is no RRC connection between the terminal device and the network device. In the inactive state, the terminal device stores configuration information, and may quickly enter the connected state based on the configuration information. The terminal device in the connected state may send an uplink signal to the network device in a dynamic-grant-based or grant-free mode. In a grant-free process, a time-frequency resource is predefined by using a protocol or the like. When sending an uplink signal, the terminal device does not require the network device to send dynamic downlink control information (DCI), but sends the uplink signal to the network device by using the predefined time-frequency resource. For the terminal device in the connected state, when a success rate of sending an uplink signal in a grant-free mode is relatively low, the network device sends an instruction, so that the terminal device sends the uplink signal in a dynamic-grant-based mode. When sending the uplink signal in the dynamic-grant-based mode, the terminal device detects, in a user-specific search space, a physical downlink control channel (PDCCH) sent by the network device, and sends, based on a related parameter, the uplink signal to the network device on a resource indicated by the DCI carried on the PDCCH.

However, for the terminal device in a non-connected state, for example, the terminal device in the idle state or the terminal device in the inactive state, there is no proper method in the industry for ensuring a success rate of uplink signal transmission.

SUMMARY

This application provides a signal transmission method and a communications apparatus, to improve a success rate of sending an uplink signal by a terminal device in a non-connected state in a grant-free mode.

According to a first aspect, an embodiment of this application provides a signal transmission method. The method may be used in a terminal device, or may be used in a chip in a terminal device. The following describes the method by using an example in which the method is used in a terminal device. The method includes: A terminal device receives first indication information sent by a network device, where the first indication information is used to indicate the terminal device to send a signal in a target transmission mode, and the target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data. The terminal device sends a signal to the network device in the target transmission mode. According to the solution, when finding that a success rate of sending an uplink signal is low, the network device determines the target transmission mode, includes the target transmission mode in the first indication information, and sends the first indication information to the terminal device, so that the terminal device sends the signal to the network device in the target transmission mode. In this process, the network device controls a transmission mode of the terminal device, to be specific, the network device determines the target transmission mode based on network load, so that a probability that a large quantity of terminal devices use the EDT mode or the first random access mode can be effectively reduced, that is, a collision probability in the EDT mode and a collision probability in the first random access mode are reduced, and a success rate of sending the uplink signal by the terminal device in the non-connected state in the grant-free mode is improved.

In a feasible design, that a terminal device receives first indication information sent by a network device includes: The terminal device receives a paging message sent by the network device, where the paging message carries the first indication information. According to the solution, the network device sends the first indication information to the terminal device via the paging message, so that the terminal device sends the signal to the network device in the target transmission mode in the first indication information, thereby improving the success rate of sending the uplink signal by the terminal device in the non-connected state in the grant-free mode.

In a feasible design, that a terminal device receives first indication information sent by a network device includes: The terminal device receives downlink control information DCI that is sent by the network device and that is scrambled by using a radio network temporary identifier RNTI, where the DCI carries the first indication information; or the terminal device receives DCI that is sent by the network device and that is scrambled by using an RNTI, and receives a physical downlink shared channel PDSCH based on the DCI, where the PDSCH carries the first indication information. According to the solution, the network device sends the first indication information to the terminal device by using the scrambled DCI, so that the terminal device sends the signal to the network device in the target transmission mode in the first indication information; or the network device sends the first indication information to the terminal device on the PDSCH, so that the terminal device receives the PDSCH based on the DCI after receiving the scrambled DCI, then determines the first indication information based on the PDSCH, and sends the signal to the network device in the target transmission mode in the first indication information, thereby improving the success rate of sending the uplink signal by the terminal device in the non-connected state in the grant-free mode.

In a feasible design, that a terminal device receives first indication information sent by a network device includes: The terminal device receives downlink control information DCI that is sent by the network device and that is scrambled by using a radio network temporary identifier RNTI, where the DCI includes a first field. The terminal device determines the first indication information based on the first field. According to the solution, the network device sends the first indication information including the first field to the terminal device via the scrambled DCI, so that the terminal device determines the first indication information based on the first field, and sends the signal to the network device in the target transmission mode in the first indication information, thereby improving the success rate of sending the uplink signal by the terminal device in the non-connected state in the grant-free mode.

In a feasible design, the terminal device is a terminal device in a coverage enhancement mode B (CE mode B), a terminal device at a coverage enhancement level 2 CE level 2, or a terminal device at a coverage enhancement level CE level 3, the DCI is DCI format 6-0B, and the first field is a modulation and coding scheme MCS field in the DCI; and all bit values of the MCS field are 1, and the target transmission mode indicated by the first indication information is the grant-free retransmission mode; or not all bit values of the MCS field are 1, and the target transmission mode is either of the first random access mode and the EDT retransmission mode. It should be noted that when the transmission mode further includes a grant-based retransmission mode, not all bit values of the MCS field are 1, and the target transmission mode is any one of the first random access mode, the EDT mode, or the grant-based retransmission mode. The grant-based retransmission mode means that the terminal device performs retransmission based on dynamic scheduling information of the network device, or the terminal device performs retransmission based on downlink control information of the network device.

Alternatively, the terminal device is a terminal device in a coverage enhancement mode A CE mode A, a terminal device at a coverage enhancement level 0 CE level 0, or a terminal device at a coverage enhancement level 1 CE level 1, the DCI is DCI format 6-0A, and the first field is a resource block assignment RA field in the DCI; and all bit values of the RA field are 1, and the target transmission mode indicated by the first indication information is the grant-free retransmission mode; or not all bit values of the RA field are 1, and the target transmission mode is either of the first random access mode and the EDT retransmission mode. It should be noted that when the transmission mode further includes a grant-based retransmission mode, not all bit values of the MCS field are 1, and the target transmission mode is any one of the first random access mode, the EDT mode, or the grant-based retransmission mode.

Alternatively, the terminal device is a terminal device in a coverage enhancement mode A CE mode A, a terminal device at a coverage enhancement level 0 CE level 0, or a terminal device at a coverage enhancement level 1 CE level 1, the DCI is DCI format 6-1A, and the first field is a resource block assignment RA field in the DCI; and all bit values of the RA field are 1, and the target transmission mode indicated by the first indication information is the grant-free retransmission mode; or not all bit values of the RA field are 1, and the target transmission mode is either of the first random access mode and the EDT retransmission mode. It should be noted that when the transmission mode further includes a grant-based retransmission mode, not all bit values of the MCS field are 1, and the target transmission mode is any one of the first random access mode, the EDT mode, or the grant-based retransmission mode.

Alternatively, the terminal device is a terminal device in a coverage enhancement mode B CE mode B, a terminal device at a coverage enhancement level 2 CE level 2, or a terminal device at a coverage enhancement level CE level 3, the DCI is DCI format 6-1B, and the first field is a resource block assignment RA field in the DCI; and all bit values of the RA field are 1, and the target transmission mode indicated by the first indication information is the grant-free retransmission mode; or not all bit values of the RA field are 1, and the target transmission mode is either of the first random access mode and the EDT retransmission mode. It should be noted that when the transmission mode further includes a grant-based retransmission mode, not all bit values of the MCS field are 1, and the target transmission mode is any one of the first random access mode, the EDT mode, or the grant-based retransmission mode.

Alternatively, the first field is a new data indicator NDI field in the DCI; and a bit value of the NDI field is 0, and the target transmission mode is the first random access mode or the EDT mode; or a bit value of the NDI field is 1, and the target transmission mode is the grant-free retransmission mode.

According to the foregoing solution, the network device sends the first indication information including the first field to the terminal device via the scrambled DCI, so that the terminal device determines the first indication information based on the first field, and sends the signal to the network device in the target transmission mode in the first indication information, thereby improving the success rate of sending the uplink signal by the terminal device in the non-connected state in the grant-free mode.

In a feasible design, that a terminal device receives first indication information sent by a network device includes: The terminal device receives downlink control information DCI that is sent by the network device and that is scrambled by using a radio network temporary identifier RNTI, where the DCI includes a first field and a second field. The terminal device determines the first indication information based on the first field and the second field. The first field may be, for example, an MCS field or an RA field. The second field may be, for example, another field other than the first field and a flag that is for distinguishing a control information format, for example, a HARQ process number field or a repetition quantity field. This is not limited in this embodiment. According to the solution, the network device sends the first indication information including the first field and the second field to the terminal device via the scrambled DCI, so that the terminal device determines the first indication information based on the first field and the second field, and sends the signal to the network device in the target transmission mode indicated by the first indication information, thereby improving the success rate of sending the uplink signal by the terminal device in the non-connected state in the grant-free mode.

In a feasible design, the RNTI includes any one of the following RNTIs: a paging radio network temporary identifier P-RNTI, a cell radio network temporary identifier C-RNTI, or a preconfigured resource RNTI. According to the solution, the DCI is DCI scrambled by using the P-RNTI, the C-RNTI, or the preconfigured resource RNTI, to flexibly scramble the DCI.

In a feasible design solution, when DCI format 6-2 carries the first indication information, the DCI format 6-2 may be DCI format 6-2 scrambled by using a paging radio network temporary identifier P-RNTI, and a flag of the DCI format 6-2 is 0. Optionally, in this case, the first indication information is located in direct indication information in the DCI format 6-2, for example, is indicated by a sixth bit, a seventh bit, or an eighth bit, or may be indicated by another unused bit. A carrying form is not limited in this embodiment of this application. According to the solution, an unused bit resource may be reused, to avoid newly adding signaling.

In a feasible design, the first indication information further includes at least one of the following information: power information, timing advance TA information, or repetition quantity information. After that a terminal device receives first indication information sent by a network device, the method further includes: The terminal device adjusts power based on the power information in the first indication information, adjusts an uplink transmission time based on the TA information, or determines a repetition quantity based on the repetition quantity information. According to the solution, the power information, the TA information, the repetition quantity, and the like are carried in the first indication information, to adjust the power, the uplink transmission time, or the repetition quantity of the terminal device.

In a feasible design, the target transmission mode is the first random access mode or the EDT mode, and before the terminal device transmits a signal in the target transmission mode based on the first indication information, the method further includes: The terminal device receives first information sent by the network device, where the first information is used to indicate a preamble, and the preamble includes at least one of the following information: a time-frequency resource used to send the preamble, a preamble sequence, a number of the preamble sequence, a random access sequence, or a number of the random access sequence. According to the solution, when the target transmission mode is the first random access mode or the EDT mode, the network device sends the first information to the terminal device, where the first information is used to indicate the preamble, and the preamble includes at least one of the following information: the time-frequency resource used to send the preamble, the preamble sequence, the number of the preamble sequence, the random access sequence, or the number of the random access sequence, so that the terminal device initiates a random access process based on the first information, thereby improving the success rate of sending the uplink signal by the terminal device in the non-connected state in the grant-free mode.

In a feasible design, the target transmission mode is the first random access mode, and that the terminal device sends a signal to the network device in the target transmission mode includes: The terminal device receives second indication information sent by the network device, where the second indication information is used to indicate, to the terminal device, a first PRACH resource corresponding to the first random access mode; and initiates a random access process on the first PRACH resource, where the first PRACH resource is used only by the terminal device. Alternatively, the terminal device selects a second PRACH resource from a first group of PRACH resources, and initiates a random access process on the second PRACH resource, where the first group of PRACH resources are shared PRACH resources, and the first group of PRACH resources include at least one second PRACH resource. In other words, the preamble sequence and/or the time-frequency resource that are/is used by the terminal device to send a random access request in the first random access mode may be selected by the terminal device from random access resources configured by the network device, or may be a dedicated preamble sequence and/or time-frequency resource configured by the network device for the terminal device (in other words, the terminal device no longer needs to select, from a plurality of preamble sequences configured by a network device, a preamble sequence and/or a time-frequency resource that need/needs to be used by the terminal device). The preamble sequence and/or the time-frequency resource configured by the network device may also be referred to as a preamble sequence and/or a time-frequency resource in a non-contention-based random access process. Essentially, the preamble sequence is configured by the network device, and is not randomly selected by the terminal device, and a preamble sequence configured by the network device is not shared with another user on a same time-frequency resource. According to the solution, when the target transmission mode is the first random access mode, the terminal device initiates the random access process on the specific first PRACH resource configured by the network device or the shared second PRACH resource, to improve the success rate of sending the uplink signal by the terminal device in the non-connected state in the grant-free mode.

In a feasible design, the target transmission mode is the EDT mode, and that the terminal device sends a signal to the network device in the target transmission mode includes: The terminal device receives third indication information sent by the network device, where the third indication information is used to indicate, to the terminal device, a third PRACH resource corresponding to the EDT mode; and initiates a random access process on the third PRACH resource, where the third PRACH resource is used only by the terminal device. Alternatively, the terminal device selects a fourth PRACH resource from a second group of PRACH resources, and initiates a random access process on the fourth PRACH resource, where the second group of PRACH resources are shared PRACH resources. In other words, the preamble sequence and/or the time-frequency resource that are/is used by the terminal device to initiate the random access request in the EDT mode may be selected by the terminal device from random access resources configured by the network device, or the preamble sequence and/or the time-frequency resource for the EDT mode may be a dedicated preamble sequence and/or time-frequency resource configured by the network device for the terminal device (in other words, the terminal device no longer needs to select, from a plurality of preamble sequences configured by a network device, a preamble sequence and/or a time-frequency resource that need/needs to be used by the terminal device). The preamble sequence and/or the time-frequency resource configured by the network device may also be referred to as a preamble sequence and/or a time-frequency resource in a non-contention-based random access process. Essentially, the preamble sequence is configured by the network device, and is not randomly selected by the terminal device, and a preamble sequence configured by the network device is not shared with another user on a same time-frequency resource. According to the solution, when the target transmission mode is the EDT mode, the terminal device initiates the random access process on the specific third PRACH resource configured by the network device or the shared fourth PRACH resource, to improve the success rate of sending the uplink signal by the terminal device in the non-connected state in the grant-free mode.

In a feasible design, when the target transmission mode is the grant-free retransmission mode, that the terminal device sends a signal to the network device in the target transmission mode includes: The terminal device sends the signal to the network device by using all or a part of a preconfigured resource, where the preconfigured resource is a resource preconfigured by the network device for the terminal device. According to the solution, the terminal device sends the signal in the grant-free transmission mode.

According to a second aspect, an embodiment of this application provides a signal transmission method. The method may be used in a network device, or may be used in a chip in a network device. The following describes the method by using an example in which the method is used in a network device. The method includes: A network device determines a target transmission mode, where the target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data. The network device sends first indication information to a terminal device, where the first indication information is used to indicate the terminal device to send a signal in the target transmission mode. The network device receives a signal sent by the terminal device in the target transmission mode. When finding that a success rate of sending an uplink signal is low, the network device determines the target transmission mode, includes the target transmission mode in the first indication information, and sends the first indication information to the terminal device, so that the terminal device sends the signal to the network device in the target transmission mode. In this process, the network device controls a transmission mode of the terminal device, to be specific, the network device determines the target transmission mode based on network load, so that a probability that a large quantity of terminal devices use the EDT mode or the first random access mode can be effectively reduced, that is, a collision probability in the EDT mode and a collision probability in the first random access mode are reduced, and a success rate of sending the uplink signal by the terminal device in the non-connected state in the grant-free mode is improved.

In a feasible design, that the network device sends first indication information to a terminal device includes: The network device sends a paging message to the terminal device, where the paging message carries the first indication information. According to the solution, the network device sends the first indication information to the terminal device via the paging message, so that the terminal device sends the signal to the network device in the target transmission mode in the first indication information, thereby improving the success rate of sending the uplink signal by the terminal device in the non-connected state in the grant-free mode.

In a feasible design, that the network device sends first indication information to a terminal device includes: The network device sends downlink control information DCI scrambled by using a radio network temporary identifier RNTI to the terminal device, where the DCI carries the first indication information; or the network device sends downlink control information DCI scrambled by using a radio network temporary identifier RNTI to the terminal device, and sends a physical downlink shared channel PDSCH based on the DCI, where the PDSCH carries the first indication information. According to the solution, the network device sends the first indication information to the terminal device by using the scrambled DCI, so that the terminal device sends the signal to the network device in the target transmission mode in the first indication information; or the network device sends the first indication information to the terminal device on the PDSCH, so that the terminal device receives the PDSCH based on the DCI after receiving the scrambled DCI, then determines the first indication information based on the PDSCH, and sends the signal to the network device in the target transmission mode in the first indication information, thereby improving the success rate of sending the uplink signal by the terminal device in the non-connected state in the grant-free mode.

In a feasible design, the RNTI includes any one of the following RNTIs: a paging radio network temporary identifier P-RNTI, a cell radio network temporary identifier C-RNTI, or a preconfigured resource RNTI. According to the solution, the DCI is DCI scrambled by using the P-RNTI, the C-RNTI, or the preconfigured resource RNTI, to flexibly scramble the DCI.

In a feasible design solution, when DCI format 6-2 carries the first indication information, the DCI format 6-2 may be DCI format 6-2 scrambled by a paging radio network temporary identifier (P-RNTI), and a flag of the DCI format 6-2 is 0. Optionally, in this case, the first indication information is located in direct indication information in the DCI format 6-2, for example, is indicated by a sixth bit, a seventh bit, or an eighth bit, or may be indicated by another unused bit. A carrying form is not limited in this embodiment of this application. According to the solution, an unused bit resource may be reused, to avoid newly adding signaling.

In a feasible design, that the network device sends first indication information to a terminal device includes: The network device sends downlink control information DCI scrambled by using a radio network temporary identifier RNTI to the terminal device, where the DCI includes a first field, and the first field is used to determine the first indication information. According to the solution, the network device sends the first indication information including the first field to the terminal device via the scrambled DCI, so that the terminal device determines the first indication information based on the first field, and sends the signal to the network device in the target transmission mode in the first indication information, thereby improving the success rate of sending the uplink signal by the terminal device in the non-connected state in the grant-free mode.

In a feasible design, that the network device sends first indication information to a terminal device includes: The network device sends downlink control information DCI scrambled by using a radio network temporary identifier RNTI to the terminal device, where the DCI includes a first field and a second field, and the first field and the second field are used to determine the first indication information. According to the solution, the network device sends the first indication information including the first field and the second field to the terminal device via the scrambled DCI, so that the terminal device determines the first indication information based on the first field and the second field, and sends the signal to the network device in the target transmission mode indicated by the first indication information, thereby improving the success rate of sending the uplink signal by the terminal device in the non-connected state in the grant-free mode.

In a feasible design, the first indication information further includes at least one of the following information: power information, timing advance TA information, or repetition quantity information. According to the solution, the power information, the TA information, the repetition quantity, and the like are carried in the first indication information, to adjust power, an uplink transmission time, or a repetition quantity of the terminal device.

In a feasible design, the target transmission mode is the first random access mode or the EDT mode, and after that the network device sends first indication information to a terminal device, the method further includes: The network device sends first information to the terminal device, where the first information is used to indicate a preamble, and the preamble includes at least one of the following information: a time-frequency resource used to send the preamble, a preamble sequence, a number of the preamble sequence, a random access sequence, or a number of the random access sequence. According to the solution, when the target transmission mode is the first random access mode or the EDT mode, the network device sends the first information to the terminal device, where the first information is used to indicate the preamble, and the preamble includes at least one of the following information: the time-frequency resource used to send the preamble, the preamble sequence, the number of the preamble sequence, the random access sequence, or the number of the random access sequence, so that the terminal device initiates a random access process based on the first information, thereby improving the success rate of sending the uplink signal by the terminal device in the non-connected state in the grant-free mode.

In a feasible design, the target transmission mode is the first random access mode, and after that the network device sends first indication information to a terminal device, the method further includes: The network device sends second indication information to the terminal device, where the second indication information is used to indicate, to the terminal device, a first PRACH resource corresponding to the first random access mode, and the first PRACH resource is used only by the terminal device; or the network device configures a first group of PRACH resources for the terminal device, where the first group of PRACH resources are shared PRACH resources, and the first group of PRACH resources include at least one second PRACH resource. According to the solution, when the target transmission mode is the first random access mode, the terminal device initiates the random access process on the specific first PRACH resource configured by the network device or the shared second PRACH resource, to improve the success rate of sending the uplink signal by the terminal device in the non-connected state in the grant-free mode.

In a feasible design, the target transmission mode is the EDT mode, and after that the network device sends first indication information to a terminal device, the method further includes: The network device sends third indication information to the terminal device, where the third indication information is used to indicate, to the terminal device, a third PRACH resource corresponding to the EDT mode, and the third PRACH resource is used only by the terminal device; or the network device configures a second group of PRACH resources for the terminal device, where the second group of PRACH resources are shared PRACH resources, and the second group of PRACH resources include at least one fourth PRACH resource. According to the solution, when the target transmission mode is the EDT mode, the terminal device initiates the random access process on the specific third PRACH resource configured by the network device or the shared fourth PRACH resource, to improve the success rate of sending the uplink signal by the terminal device in the non-connected state in the grant-free mode.

In a feasible design, when the target transmission mode is the grant-free retransmission mode, that the network device receives a signal sent by the terminal device in the target transmission mode includes: The network device receives the signal that is sent by the terminal device to the network device in the grant-free retransmission mode by using all or a part of a preconfigured resource, where the preconfigured resource is a resource preconfigured by the network device for the terminal device. According to the solution, the terminal device sends the signal in the grant-free transmission mode.

According to a third aspect, an embodiment of this application provides a signal transmission method. The method may be used in a terminal device, or may be used in a chip in a terminal device. The following describes the method by using an example in which the method is used in a terminal device. The method includes: A terminal device determines a target transmission mode based on a quantity of pieces of acknowledgement information, where the target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data. The terminal device sends a signal to the network device in the target transmission mode. According to the solution, when finding that a success rate of sending an uplink signal is low, the terminal device determines the target transmission mode based on the acknowledgement information, and sends the signal to the network device in the target transmission mode. In this process, the terminal device determines the target transmission mode based on the quantity of pieces of acknowledgement information, to improve the success rate of sending the uplink signal by the terminal device in the non-connected state in the grant-free mode.

In a feasible implementation, that the terminal device determines a target transmission mode based on a quantity of pieces of acknowledgement information includes: The terminal device determines whether the quantity of acknowledgement messages is less than or equal to a preset threshold; and if the quantity is less than or equal to the preset threshold, the terminal device determines that the target transmission mode is the grant-free retransmission mode. According to the solution, when the quantity of pieces of NACK information received by the terminal device or the quantity of pieces of ACK information not received by the terminal device is less than or equal to the preset threshold, the terminal device sends the signal in the grant-free retransmission mode, to improve the success rate of sending the uplink signal by the terminal device in the non-connected state in the grant-free mode. The preset threshold includes but is not limited to 1.

In a feasible design, that the terminal device determines a target transmission mode based on a quantity of pieces of acknowledgement information includes: If the quantity is greater than the preset threshold, the terminal device reads fourth indication information from radio resource control RRC configuration information, where the fourth indication information is used to indicate that the target transmission mode is the first random access mode or the EDT mode. The terminal device determines the target transmission mode based on the fourth indication information. According to the solution, when the quantity of pieces of NACK information received by the terminal device or the quantity of pieces of ACK information not received by the terminal device is greater than the preset threshold, the terminal device determines the target transmission mode based on the fourth indication information, to improve the success rate of sending the uplink signal by the terminal device in the non-connected state in the grant-free mode.

In a feasible design, that the terminal device determines a target transmission mode based on a quantity of pieces of acknowledgement information includes: If the quantity is greater than the preset threshold, the terminal device determines, based on first information, that the target transmission mode is the first random access mode or the EDT mode, where the first information is an identity and/or a time-frequency resource of the terminal device. According to the solution, when the quantity of pieces of NACK information received by the terminal device or the quantity of pieces of ACK information not received by the terminal device is greater than the preset threshold, the terminal device determines the target transmission mode based on the identity and/or the time-frequency resource, to improve the success rate of sending the uplink signal by the terminal device in the non-connected state in the grant-free mode.

In a feasible design, the target transmission mode is the first random access mode, and before the terminal device transmits a signal in the target transmission mode based on the first indication information, the method further includes: The terminal device receives first information sent by the network device, where the first information is used to indicate a preamble, and the preamble includes at least one of the following information: a time-frequency resource used to send the preamble, a preamble sequence, a number of the preamble sequence, a random access sequence, or a number of the random access sequence. According to the solution, when the target transmission mode is the first random access mode or the EDT mode, the network device sends the first information to the terminal device, where the first information is used to indicate the preamble, and the preamble includes at least one of the following information: the time-frequency resource used to send the preamble, the preamble sequence, the number of the preamble sequence, the random access sequence, or the number of the random access sequence, so that the terminal device initiates a random access process based on the first information, thereby improving the success rate of sending the uplink signal by the terminal device in the non-connected state in the grant-free mode.

In a feasible design, the acknowledgement information is negative acknowledgement information received by the terminal device or acknowledgement information not received by the terminal device. According to the solution, the acknowledgement information is flexibly set, so that the terminal device can determine the target transmission mode for different scenarios.

According to a fourth aspect, an embodiment of this application provides a signal transmission method. The method may be used in a network device, or may be used in a chip in a network device. The following describes the method by using an example in which the method is used in a network device. The method includes: A network device sends acknowledgement information to a terminal device, so that the terminal device determines a target transmission mode based on a quantity of pieces of acknowledgement information, where the target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data. The network device receives a signal sent by the terminal device in the target transmission mode. According to the solution, when finding that a success rate of sending an uplink signal is low, the terminal device determines the target transmission mode based on the acknowledgement information, and sends the signal to the network device in the target transmission mode. In this process, the terminal device determines the target transmission mode based on the quantity of pieces of acknowledgement information, to improve the success rate of sending the uplink signal by the terminal device in the non-connected state in the grant-free mode.

In a feasible design, the target transmission mode is the first random access mode or the EDT mode, and after that a network device sends acknowledgement information to a terminal device, the method further includes: The network device sends first information to the terminal device, where the first information is used to indicate a preamble, and the preamble includes at least one of the following information: a time-frequency resource used to send the preamble, a preamble sequence, a number of the preamble sequence, a random access sequence, or a number of the random access sequence. According to the solution, when the target transmission mode is the first random access mode or the EDT mode, the network device sends the first information to the terminal device, where the first information is used to indicate the preamble, and the preamble includes at least one of the following information: the time-frequency resource used to send the preamble, the preamble sequence, the number of the preamble sequence, the random access sequence, or the number of the random access sequence, so that the terminal device initiates a random access process based on the first information, thereby improving the success rate of sending the uplink signal by the terminal device in the non-connected state in the grant-free mode.

According to a fifth aspect, an embodiment of this application provides a communications apparatus. The communications apparatus may be a terminal device, or may be a chip in a terminal device. The communications apparatus may include a processing module, a receiving module, and a sending module. When the apparatus is a terminal device, the processing module may be a processor, the receiving module may be a receiver, and the sending module may be a transmitter. The terminal device may further include a storage module, and the storage module may be a memory. The storage module is configured to store an instruction, and the processing module executes the instruction stored in the storage module, so that the terminal device performs the signal transmission method according to any one of the first aspect or the possible implementations of the first aspect. When the apparatus is a chip in a terminal device, the processing module may be a processor, and the receiving module and the sending module may be an input/output interface, a pin, a circuit, or the like. The processing module executes an instruction stored in a storage module, so that the terminal device performs the signal transmission method according to any one of the first aspect or the possible implementations of the first aspect. The storage module may be a storage module (for example, a register or a cache) in the chip, or may be a storage module (for example, a read-only memory or a random access memory) located outside the chip and inside the terminal device.

According to a sixth aspect, an embodiment of this application provides a communications apparatus. The communications apparatus may be a network device, or may be a chip in a network device. The communications apparatus may include a processing module, a sending module, and a receiving module. When the apparatus is a network device, the processing module may be a processor, the sending module may be a transmitter, and the receiving module may be a receiver. The network device may further include a storage module, and the storage module may be a memory. The storage module is configured to store an instruction, and the processing module executes the instruction stored in the storage module, so that the network device performs the signal transmission method according to any one of the second aspect or the possible implementations of the second aspect. When the apparatus is a chip in a network device, the processing module may be a processor, and the receiving module and the sending module may be an input/output interface, a pin, a circuit, or the like. The processing module executes an instruction stored in a storage module, so that the network device performs the signal transmission method according to any one of the second aspect or the possible implementations of the second aspect. The storage module may be a storage module (for example, a register or a cache) in the chip, or may be a storage module (for example, a read-only memory or a random access memory) located outside the chip and inside the network device.

According to a seventh aspect, an embodiment of this application provides a communications apparatus. The communications apparatus may be a terminal device, or may be a chip in a terminal device. The communications apparatus may include a processing module, a receiving module, and a sending module. When the apparatus is a terminal device, the processing module may be a processor, the receiving module may be a receiver, and the sending module may be a transmitter. The terminal device may further include a storage module, and the storage module may be a memory. The storage module is configured to store an instruction, and the processing module executes the instruction stored in the storage module, so that the terminal device performs the signal transmission method according to any one of the third aspect or the possible implementations of the third aspect. When the apparatus is a chip in a terminal device, the processing module may be a processor, and the receiving module and the sending module may be an input/output interface, a pin, a circuit, or the like. The processing module executes an instruction stored in a storage module, so that the terminal device performs the signal transmission method according to any one of the third aspect or the possible implementations of the third aspect. The storage module may be a storage module (for example, a register or a cache) in the chip, or may be a storage module (for example, a read-only memory or a random access memory) located outside the chip and inside the terminal device.

According to an eighth aspect, an embodiment of this application provides a communications apparatus. The communications apparatus may be a network device, or may be a chip in a network device. The communications apparatus may include a processing module, a sending module, and a receiving module. When the apparatus is a network device, the processing module may be a processor, the sending module may be a transmitter, and the receiving module may be a receiver. The network device may further include a storage module, and the storage module may be a memory. The storage module is configured to store an instruction, and the processing module executes the instruction stored in the storage module, so that the network device performs the signal transmission method according to any one of the fourth aspect or the possible implementations of the fourth aspect. When the apparatus is a chip in a network device, the processing module may be a processor, and the receiving module and the sending module may be an input/output interface, a pin, a circuit, or the like. The processing module executes an instruction stored in a storage module, so that the network device performs the signal transmission method according to any one of the fourth aspect or the possible implementations of the fourth aspect. The storage module may be a storage module (for example, a register or a cache) in the chip, or may be a storage module (for example, a read-only memory or a random access memory) located outside the chip and inside the network device.

According to a ninth aspect, an embodiment of this application provides a computer program product including an instruction. When the computer program product runs on a computer, the computer is enabled to perform the method according to any one of the first aspect or the possible implementations of the first aspect.

According to a tenth aspect, an embodiment of this application provides a computer program product including an instruction. When the computer program product runs on a computer, the computer is enabled to perform the method according to any one of the second aspect or the possible implementations of the second aspect.

According to an eleventh aspect, an embodiment of this application provides a computer program product including an instruction. When the computer program product runs on a computer, the computer is enabled to perform the method according to any one of the third aspect or the possible implementations of the third aspect.

According to a twelfth aspect, an embodiment of this application provides a computer program product including an instruction. When the computer program product runs on a computer, the computer is enabled to perform the method according to any one of the fourth aspect or the possible implementations of the fourth aspect.

According to a thirteenth aspect, an embodiment of this application provides a computer-readable storage medium. The computer-readable storage medium stores an instruction, and when the instruction is run on a computer, the computer is enabled to perform the method according to any one of the first aspect or the possible implementations of the first aspect.

According to a fourteenth aspect, an embodiment of this application provides a computer-readable storage medium. The computer-readable storage medium stores an instruction, and when the instruction is run on a computer, the computer is enabled to perform the method according to any one of the second aspect or the possible implementations of the second aspect.

According to a fifteenth aspect, an embodiment of this application provides a computer-readable storage medium. The computer-readable storage medium stores an instruction, and when the instruction is run on a computer, the computer is enabled to perform the method according to any one of the third aspect or the possible implementations of the third aspect.

According to a sixteenth aspect, an embodiment of this application provides a computer-readable storage medium. The computer-readable storage medium stores an instruction, and when the instruction is run on a computer, the computer is enabled to perform the method according to any one of the fourth aspect or the possible implementations of the fourth aspect.

According to a seventeenth aspect, an embodiment of this application provides a chip. The chip includes a processor, may further include a memory, and may further include a communications interface, to implement a function of the terminal device in the foregoing method. The chip may include a chip, or may include a chip and another discrete device.

According to an eighteenth aspect, an embodiment of this application provides a chip. The chip includes a processor, may further include a memory, and may further include a communications interface, to implement a function of the network device in the foregoing method. The chip may include a chip, or may include a chip and another discrete device.

According to the signal transmission method and the communications apparatus provided in the embodiments of this application, when finding that the success rate of sending the uplink signal is low, the network device determines the target transmission mode, includes the target transmission mode in the first indication information, and sends the first indication information to the terminal device, so that the terminal device sends the signal to the network device in the target transmission mode. In this process, the network device controls a transmission mode of the terminal device, to be specific, the network device determines the target transmission mode based on network load, so that a probability that a large quantity of terminal devices use the EDT mode or the first random access mode can be effectively reduced, that is, a collision probability in the EDT mode and a collision probability in the first random access mode are reduced, and the success rate of sending the uplink signal by the terminal device in the non-connected state in the grant-free mode is improved.

DESCRIPTION OF EMBODIMENTS

Figure 1:
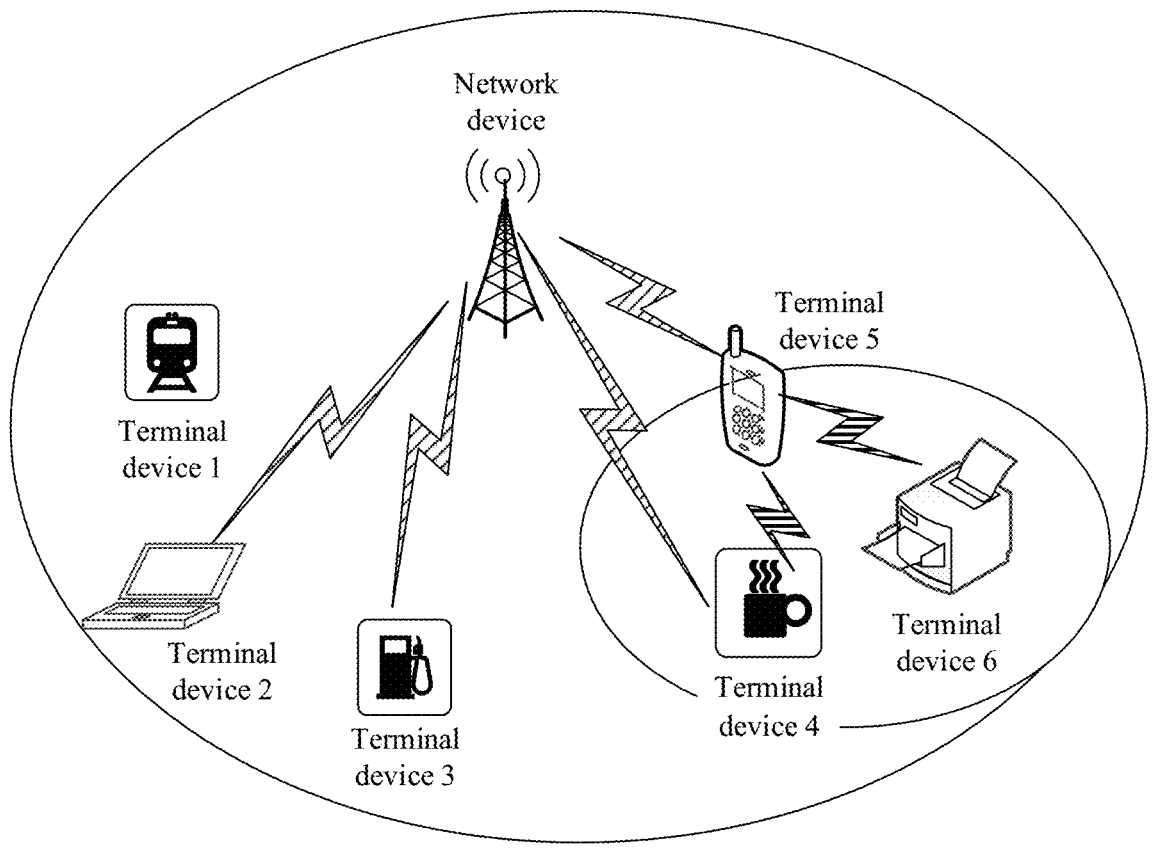
FIG. 1 is a schematic diagram of a scenario applicable to a signal transmission method according to an embodiment of this application.

Usually, a status of a terminal device may be classified into a connected state, an inactive state, an idle state, and the like based on an RRC connection status of the terminal device. In the connected state, a radio resource control (RRC) connection is established between the terminal device and a network device, and the terminal device can directly communicate with the network device. In the idle state, there is no RRC connection between the terminal device and the network device, data cannot be directly transmitted, and data transmission can be performed only after an RRC connection is established. The inactive state is a state between the connected state and the idle state, and in the inactive state, the terminal device stores configuration information and may quickly enter the connected state based on the configuration information. For the terminal device in the connected state, when the terminal device sends an uplink signal to the network device in a grant-free mode, if a transmission failure rate of the uplink signal is relatively high, the network device indicates, by using an RRC connection, the terminal device to send the uplink signal in a dynamic-grant-based mode. In the dynamic-grant-based mode, the terminal device receives, through blind detection, a PDCCH sent by the network device, and sends the uplink signal on a resource indicated by DCI carried on the PDCCH. The PDCCH may include at least one of a machine type communication physical downlink control channel (MTC Physical Downlink Control Channel, MPDCCH) and a narrowband physical downlink control channel (NB Physical Downlink Control Channel, NPDCCH). Currently, it is being discussed that when the terminal device is in a non-connected state, for example, in the inactive state or the idle state, the terminal device sends an uplink signal to the network device in the grant-free mode. However, for the terminal device in the non-connected state, when a success rate of sending the uplink signal in the grant-free mode is relatively low, because no RRC connection is established between the terminal device and the network device, and there is no user-specific search space, the grant-free mode cannot be switched to a dynamic-grant-based mode. Therefore, for the terminal device in the non-connected state, when the success rate of sending the uplink signal in the grant-free mode is relatively low, there is no appropriate method in the industry to ensure a success rate of uplink signal transmission.

In view of this, embodiments of this application provide a signal transmission method, to improve the success rate of sending the uplink signal by the terminal device in the non-connected state in the grant-free mode.

The signal transmission method provided in the embodiments of this application may be used for a 3rd generation mobile communication (3G) system, a long term evolution (LTE) system, a 4th generation mobile communication (4G) system, an advanced long term evolution (LTE-A) system, a cellular system related to the 3rd generation partnership project (3GPP), a 5th generation mobile communication (5G) system, a derivative system based on LTE-A, and a subsequent evolved communications system. The derivative system based on LTE-A includes: an eMTC system, a further eMTC system, an even further eMTC system, and the like.

The network device in the embodiments of this application may be a base station such as a macro base station or a micro base station, and is a device that is deployed in a radio access network and that can perform wireless communication with a terminal device. The base station may be configured to perform conversion between a received over-the-air frame and an internet protocol (IP) packet and serve as a router between the terminal device and a remaining part of the access network, where the remaining part of the access network may include an IP network. The base station may further coordinate attribute management of an air interface. For example, the base station may be a base transceiver station (BTS) in a global system for mobile communications (GSM) or a code division multiple access (CDMA) system, or may be a NodeB in a wideband code division multiple access (WCDMA) system, or may be an evolved NodeB (eNB or e-NodeB, evolutional Node B) in LTE, or may be a gNB in NR, or the like. Alternatively, the base station may be a radio controller in a cloud radio access network (CRAN) scenario, or may be a relay station, an access point, a vehicle-mounted device, a wearable device, a network device in a 5G network, a network device in a future evolved PLMN network, or the like. This is not limited in the embodiments of this application.

The terminal device in the embodiments of this application may be a device that may provide a user with voice and/or data connectivity, a handheld device with a wireless connection function, or another processing device connected to a wireless modem. The terminal device may communicate with one or more core networks through a radio access network (RAN). The terminal device may be a mobile terminal device, such as a mobile phone (also referred to as a "cellular" phone) or a computer with a mobile terminal device, for example, may be a portable, pocket-sized, handheld, computer built-in, or in-vehicle mobile apparatus. They exchange a voice and/or data with the radio access network. For example, the terminal device may be a personal communications service (PCS) telephone, a cordless telephone, a session initiation protocol (SIP) telephone, a wireless local loop (WLL) station, a personal digital assistant (PDA), a handheld device with a wireless communication function, a computing device, another processing device connected to a wireless modem, a vehicle-mounted device, a wearable device, a terminal in a future 5G network, a terminal device in a future evolved public land mobile network (PLMN), an eMTC terminal device, or the like. This is not limited in the embodiments of this application. The terminal device may also be referred to as a system, a subscriber unit, a subscriber station, a mobile station, a mobile, a remote station, an access point, a remote terminal device, an access terminal device, a user terminal device (user terminal), a user agent, a user device, or user equipment.

FIG. 1 is a schematic diagram of a scenario applicable to a signal transmission method according to an embodiment of this application. Referring to FIG. 1, a network device and a terminal device 1 to a terminal device 6 form a communications system. In the communications system, any one of the terminal device 1 to the terminal device 6 receives first indication information sent by the network device, and sends a signal to the network device in a target transmission mode indicated by the first indication information. In addition, the terminal device 4 to the terminal device 6 also form a communications system. In the communications system, either of the terminal device 4 and the terminal device 6 receives first indication information sent by the terminal device 5, and sends a signal to the terminal device 5 in a target transmission mode indicated by the first indication information.

The following describes in detail the signal transmission method in this application based on the scenario shown in FIG. 1. For example, refer to FIG. 2.

Figure 2:
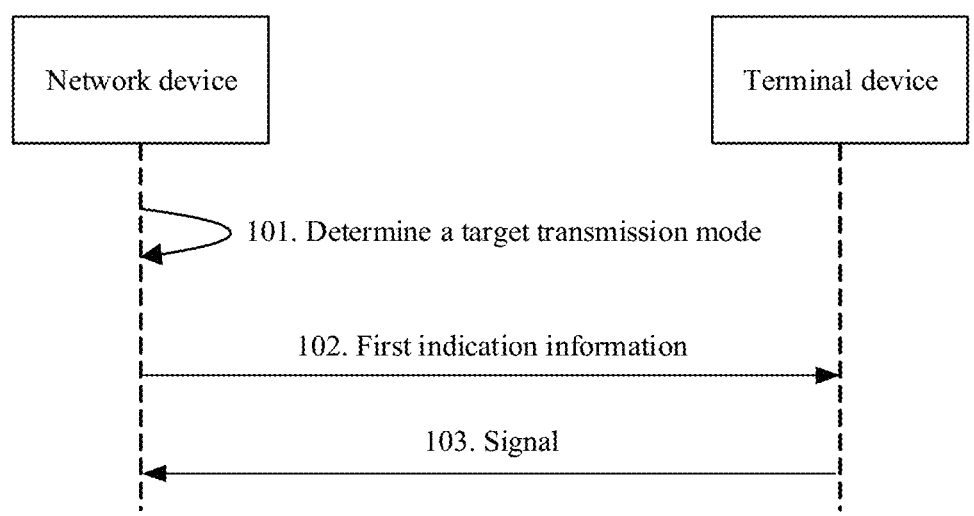
FIG. 2 is a flowchart of a signal transmission method according to an embodiment of this application.

FIG. 2 is a flowchart of a signal transmission method according to an embodiment of this application. In this embodiment, the signal transmission method in this application is described from a perspective of interaction between a network device and a terminal device.

This embodiment includes the following steps.

101. The network device determines a target transmission mode.

The target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data.

Optionally, in this embodiment of this application, the terminal device sends a signal to the network device, and after determining, in a manner such as demodulation reference signal (DMRS) detection or energy detection, the signal sent by the terminal device, the network device receives and decodes data carried in the signal. When the network device fails in decoding or a quantity of decoding failures is greater than a preset value, the target transmission mode may be determined based on network load or the like. For example, when determining that there are a relatively large quantity of terminal devices that currently send signals in the first random access mode, in other words, network load for the first random access mode is relatively heavy, the network device determines that the target transmission mode is the EDT mode. For another example, when determining that there are a relatively large quantity of terminal devices that currently send signals in the EDT mode, in other words, network load for the EDT mode is relatively heavy, the network device determines that the target transmission mode is the first random access mode. For another example, when determining that power of the terminal device is relatively low, the network device adjusts the power of the terminal device, and determines that the target transmission mode is the grant-free retransmission mode.

102. The network device sends first indication information to the terminal device.

In this embodiment of this application, a non-connected state is a state other than a connected state, and includes but is not limited to an idle state and an inactive state. The terminal device is a terminal device in the non-connected state, and the terminal device in the non-connected state sends a signal to the network device in the grant-free mode. For example, the terminal device in the inactive state sends an uplink signal to the network device in the grant-free mode. For another example, the terminal device in the idle state sends an uplink signal to the network device in the grant-free mode. The grant-free mode means that the network device preconfigures a resource for the terminal device, and the terminal device uses the resource to send an uplink signal or receive a signal. In this way, the network device does not need to dynamically deliver control information to specify a resource for the terminal device. When the terminal device is in the connected state or the non-connected state, the terminal device may perform grant-free transmission on the preconfigured resource. The preconfigured resource may also be referred to as a grant-free resource. Grant-free retransmission means that retransmission is performed on the configured grant-free resource, and the configured grant-free resource is used for initial transmission of an uplink signal or a downlink signal. In addition, the grant-free retransmission may also be referred to as preconfigured resource retransmission, configured grant retransmission, or the like. The grant-free retransmission is merely an example name, and in essence, the retransmission is performed on the configured grant-free resource. In other words, in the grant-free mode, a time-frequency resource for the grant-free mode is predefined or preconfigured, and the terminal device may send an uplink signal or receive a downlink signal on the predefined or preconfigured time-frequency resource. The preconfigured resource includes a preconfigured uplink resource (PUR), a preconfigured downlink resource (PDR), and the like. The PUR and the PDR are merely example names. The PUR is used as an example. Essentially, the network device configures a first resource for the terminal device, so that the terminal device can transmit uplink information on the first resource without requiring the network device to perform dynamic scheduling or use downlink control information to perform scheduling. The first resource is a PUR, and the first resource may alternatively have another name, for example, a configured grant resource. It should be understood that if the configured grant resource can also implement a function implemented by the first resource in this embodiment of this application, the configured grant resource may also be understood as the first resource in this embodiment of this application.

Optionally, in this step, the network device includes the target transmission mode in the first indication information, and sends the first indication information to the terminal device, to indicate the terminal device to send a signal in the target transmission mode. Correspondingly, the terminal device receives the first indication information sent by the network device. The target transmission mode includes any one of the following transmission modes: the first random access mode, the early data transmission (EDT) mode, and the grant-free retransmission mode. The transmission modes are described in detail below.

First, the first random access mode is described.

Optionally, in this embodiment of this application, the first random access mode may be a contention-based random access mode, and includes the following steps: Step 1. The terminal device sends a random access request, namely, a message 1 (Msg1), to the network device, to request random access. Step 2. After receiving Msg1, the network device sends a random access response (RAR) message, namely, a message 2 (Msg2), to the terminal device, to respond to the terminal device. Step 3. After receiving Msg2, the terminal device sends uplink information, namely, a message 3 (Msg3), on an uplink transmission resource allocated by the network device. Step 4. After receiving Msg3, the network device sends a contention resolution message, namely, a message 4 (Msg4), to the terminal device. Msg3 does not carry an uplink signal of the terminal device. Optionally, in this embodiment of this application, the first random access mode may alternatively be a non-contention-based random access mode, and includes the following steps: Step 1. The terminal device sends a random access request, namely, a message 1 (Msg1), to the network device, to request random access. Step 2. After receiving Msg1, the network device sends a random access response (RAR) message, namely, a message 2 (Msg2), to the terminal device, to respond to the terminal device. A random access process is completed to establish an RRC connection.

Second, the EDT mode is described.

Optionally, in this embodiment of this application, the EDT mode is also a random access mode, for example, may be a contention-mechanism-based random access mode. In a process in which the terminal device initiates random access, the terminal device exchanges Msg1 to Msg4 with the network device. For an example process, refer to the descriptions of the contention-mechanism-based random access process in the first random access mode. Details are not described herein again. A difference from the first random access mode lies in that, for Msg in the early data transmission EDT mode, the message 3 carries uplink data of the terminal device.

Optionally, in this embodiment of this application, the EDT mode may alternatively be a non-contention-mechanism-based random access mode. In a process in which the terminal device initiates random access, the terminal device exchanges Msg1 and Msg2 with the network device. For an example process, refer to the descriptions of the non-contention-mechanism-based random access mode in the first random access mode. Details are not described herein again. A difference from the first random access mode lies in that, in the early data transmission EDT mode, uplink data starts to be sent after the message 2.

Finally, the grant-free retransmission mode is described.

In this embodiment of this application, when the network device fails to decode a received uplink signal because of a reason such as relatively low power of the terminal device, thus resulting in a low success rate, the network device indicates the terminal device to perform grant-free retransmission. Optionally, the network device may further indicate power information, a repetition quantity, and/or the like to the terminal device, so that the terminal device adjusts the power, the repetition quantity, and the like.

In addition, when using the grant-free retransmission mode, the terminal device may send the signal to the network device by using all or a part of a preconfigured resource. The preconfigured resource is a resource preconfigured by the network device for the terminal device.

It should be noted that the target transmission mode is any one of the first random access mode, the EDT mode, or the grant-free retransmission mode. However, this is not limited in this embodiment of this application. In another feasible implementation, the target transmission mode may be any one of the first random access mode, the EDT mode, the grant-free retransmission mode, or a grant-based retransmission mode. The grant-based retransmission mode means that the terminal device performs retransmission based on dynamic scheduling information of the network device, or the terminal device performs retransmission based on downlink control information of the network device.

103. The terminal device sends a signal to the network device in the target transmission mode.

In this step, after receiving a first indication information, the terminal device sends the signal to the network device in the target transmission mode indicated by the first indication information. For example, when the target transmission mode is the first random access mode, the terminal device initiates a random access process on a physical random access channel (PRACH) corresponding to the first random access mode. In this process, Msg3 does not carry an uplink signal, or the process is a non-contention-mechanism-based random access process. For another example, when the target transmission mode is the EDT mode, the terminal device initiates a random access process on a PRACH resource corresponding to the EDT mode. In this process, Msg3 carries an uplink signal. The PRACH resource includes a preamble sequence, a time-frequency resource, and the like. For still another example, when the target transmission mode is the grant-free retransmission mode, the terminal device continues to resend the signal to the network device in the grant-free mode.

According to the signal transmission method provided in this embodiment of this application, when finding that the success rate of sending the uplink signal is low, the network device determines the target transmission mode, includes the target transmission mode in the first indication information, and sends the first indication information to the terminal device, so that the terminal device sends the signal to the network device in the target transmission mode. In this process, the network device controls a transmission mode of the terminal device, to be specific, the network device determines the target transmission mode based on network load, so that a probability that a large quantity of terminal devices use the EDT mode or the first random access mode can be effectively reduced, that is, a collision probability in the EDT mode and a collision probability in the first random access mode are reduced, and a success rate of sending the uplink signal by the terminal device in the non-connected state in the grant-free mode is improved.

The following describes in detail how the network device sends the first indication information to the terminal device in the foregoing embodiment.

In a feasible implementation, when sending the first indication information to the terminal device, the network device sends a paging message to the terminal device, where the paging message carries the first indication information.

For example, the network device sends, to the terminal device, a paging message that carries the first indication information. The terminal device receives a paging message based on a paging occasion. The paging message carries a user equipment identity (UE-ID) list, and the terminal device determines, based on a UE-ID of the terminal device, whether the UE-ID of the terminal device exists in the UE-ID list. If the UE-ID list includes the UE-ID of the terminal device, the terminal device further reads the paging message, and parses out the first indication information from the paging message. For example, the first indication information may be carried in a paging record in the paging message or at another location. This is not limited in this embodiment of this application. In addition, in this embodiment of this application, the UE-ID may be a system architecture evolution temporary mobile station identifier (System Architecture Evolution)-Temporary Mobile Station Identifier, S-TMSI), an international mobile subscriber identity (IMSI), a cell radio network temporary identifier (C-RNTI), or the like.

The following describes in detail the first indication information in the foregoing embodiment.

For example, the first indication information is 1-bit information, 1 indicates that the target transmission mode is the EDT mode, and 0 indicates that the target transmission mode is the first random access mode.

For another example, the first indication information is 2-bit information, 00 indicates that the target transmission mode is the grant-free retransmission mode, 01 indicates that the target transmission mode is the first random access mode, and 10 indicates that the target transmission mode is the EDT mode.

For still another example, the first indication information is 1-bit information, 0 indicates that the target transmission mode is the grant-free retransmission mode, and 1 indicates that the target transmission mode is the EDT mode or the first random access mode. When the first indication information is 1, the terminal device randomly falls back to the first random access mode or the EDT mode. Alternatively, if the terminal device supports the EDT mode, the terminal device falls back to the EDT mode. Alternatively, if the terminal device does not support the EDT mode, the terminal device falls back to the first random access mode. Alternatively, the terminal device determines, based on the UE-ID of the terminal device, to fall back to the EDT mode or the first random access mode. For example, the terminal device determines a value of mod(UE-ID, 2), and when mod(UE-ID, 2)=1, that is, a remainder between the UE-ID and 2 is 1, the terminal device falls back to the EDT mode. When mod(UE-ID, 2)=0, that is, a remainder between the UE-ID and 2 is 0, the terminal device falls back to the first random access mode.

For still another example, the first indication information is 1-bit information, 0 indicates that the target transmission mode is the grant-free retransmission mode, and 1 indicates that the target transmission mode is the first random access mode.

For still another example, the first indication information is 1-bit information, 0 indicates that the target transmission mode is the grant-free retransmission mode, and 1 indicates that the target transmission mode is the EDT mode.

It should be noted that the foregoing describes only an example of a size, content, and the like of the first indication information. However, this is not limited in this embodiment of this application. In another feasible implementation, the size and the content of the first indication information may alternatively be flexibly set based on a requirement.

In this embodiment, the network device sends the first indication information to the terminal device via the paging message, so that the terminal device sends the signal to the network device in the target transmission mode in the first indication information, thereby improving the success rate of sending the uplink signal by the terminal device in the non-connected state in the grant-free mode.

In a feasible implementation, when sending the first indication information to the terminal device, the network device sends, to the terminal device, downlink control information DCI scrambled by using a radio network temporary identifier (radio network temporary identity, RNTI), where the DCI carries the first indication information. It should be noted that, that the DCI carries the first indication information may be understood as that the DCI includes the first indication information, the DCI includes the first indication information, or the like.

For example, the network device sends, to the terminal device, DCI that carries the first indication information, where the DCI is DCI scrambled by using an RNTI. After receiving the DCI, the terminal device may parse the DCI to obtain the first indication information. For example, when the DCI includes the first indication information, the first indication information is included in a new data indicator NDI field of the DCI. When a bit value of the NDI field is 0, the target transmission mode is the first random access mode or the EDT mode; or when a bit value of the NDI field is 1, the target transmission mode is the grant-free retransmission mode. Alternatively, when a bit value of the NDI is 0, the target transmission mode is the grant-free transmission mode; or when a bit value of the NDI is 1, the target transmission mode is the first random access mode or the EDT mode.

When this solution is used, for descriptions of the first indication information, refer to the descriptions of the first indication information in the foregoing sending the first indication information via the paging message. Details are not described herein again.

In this embodiment, the network device sends the first indication information to the terminal device via the scrambled DCI, so that the terminal device sends the signal to the network device in the target transmission mode in the first indication information, thereby improving the success rate of sending the uplink signal by the terminal device in the non-connected state in the grant-free mode.

In a feasible implementation, when sending the first indication information to the terminal device, the network device sends, to the terminal device, downlink control information DCI scrambled by using a radio network temporary identifier (radio network temporary identity, RNTI), where the DCI carries the first indication information. After receiving the DCI, the terminal device receives a physical downlink shared channel PDSCH based on the DCI, where the PDSCH carries the first indication information.

Compared with the foregoing embodiment in which the DCI carries the first indication information, in this embodiment, the first indication information is carried on the PDSCH. After receiving the DCI, the terminal device receives the PDSCH on a resource indicated by the DCI, and further reads the PDSCH to obtain the first indication information.

When this solution is used, for descriptions of the first indication information, refer to the descriptions of the first indication information in the foregoing sending the first indication information via the paging message. Details are not described herein again.

In this embodiment, the network device sends the first indication information to the terminal device on the PDSCH, so that after receiving the scrambled DCI, the terminal device receives the PDSCH based on the DCI, further determines the first indication information based on the PDSCH, and sends the signal to the network device in the target transmission mode in the first indication information, thereby improving the success rate of sending the uplink signal by the terminal device in the non-connected state in the grant-free mode.

In a feasible implementation, when sending the first indication information to the terminal device, the network device sends, to the terminal device, downlink control information DCI scrambled by using a radio network temporary identifier (radio network temporary identity, RNTI), where the DCI includes a first field. After receiving the DCI that includes the first field, the terminal device determines the first indication information based on the first field.

For example, a correspondence between the first field and the target transmission mode that is indicated by the first indication information may be preconfigured on the terminal device, so that after receiving the DCI, the terminal device may parse a field in the DCI, to determine the first indication information and determine the target transmission mode. For example, the first field is preconfigured as a modulation and coding scheme (MCS) of DCI. When all bit values of the MCS field are 1, the first indication information indicates the grant-free retransmission mode.

In this embodiment, the network device sends the first indication information including the first field to the terminal device via the scrambled DCI, so that the terminal device determines the first indication information based on the first field, and sends the signal to the network device in the target transmission mode in the first indication information, thereby improving the success rate of sending the uplink signal by the terminal device in the non-connected state in the grant-free mode.

The following describes in detail how the terminal device determines the first indication information based on the first field.

In a feasible design, the terminal device is a terminal device in a coverage enhancement mode B (CE Mode B), the DCI is DCI format 6-0B, and the first field is a modulation and coding scheme MCS field in the DCI; and all bit values of the MCS field are 1, and the target transmission mode indicated by the first indication information is the grant-free retransmission mode; or not all bit values of the MCS field are 1, and the target transmission mode is either of the first random access mode and the EDT retransmission mode. It should be noted that when the transmission mode further includes the grant-based retransmission mode, not all bit values of the MCS field are 1, and the target transmission mode is any one of the first random access mode, the EDT mode, or the grant-based retransmission mode.

In another feasible design, the terminal device is a terminal device in a coverage enhancement mode A CE mode A, the DCI is DCI format 6-0A, and the first field is a resource block assignment (RA) field in the DCI; and when all bit values of the RA field are 1, the target transmission mode indicated by the first indication information is the grant-free retransmission mode; or when not all bit values of the RA field are 1, the target transmission mode is either of the first random access mode and the EDT retransmission mode. It should be noted that when the transmission mode further includes the grant-based retransmission mode, not all bit values of the MCS field are 1, and the target transmission mode is any one of the first random access mode, the EDT mode, or the grant-based retransmission mode.

In still another feasible design, the terminal device is a terminal device in a coverage enhancement mode A CE mode A, the DCI is DCI format 6-1A, and the first field is a resource block assignment RA field in the DCI; and when all bit values of the RA field are 1, the target transmission mode indicated by the first indication information is the grant-free retransmission mode; or when not all bit values of the RA field are 1, the target transmission mode is either of the first random access mode and the EDT retransmission mode. It should be noted that when the transmission mode further includes the grant-based retransmission mode, not all bit values of the MCS field are 1, and the target transmission mode is any one of the first random access mode, the EDT mode, or the grant-based retransmission mode.

In still another feasible design, the terminal device is a terminal device in a coverage enhancement mode B CE mode B, the DCI is DCI format 6-1B, and the first field is a resource block assignment RA field in the DCI; and when all bit values of the RA field are 1, the target transmission mode indicated by the first indication information is the grant-free retransmission mode; or when not all bit values of the RA field are 1, the target transmission mode is either of the first random access mode and the EDT retransmission mode. It should be noted that when the transmission mode further includes the grant-based retransmission mode, not all bit values of the MCS field are 1, and the target transmission mode is any one of the first random access mode, the EDT mode, or the grant-based retransmission mode.

In still another feasible design, the first field is a new data indicator NDI field in the DCI. When a bit value of the NDI field is 0, the target transmission mode is the first random access mode or the EDT mode; or when a bit value of the NDI field is 1, the target transmission mode is the grant-free retransmission mode. Alternatively, when a bit value of the NDI field is 0, the target transmission mode is the grant-free transmission mode; or when a bit value of the NDI field is 1, the target transmission mode is the first random access mode or the EDT mode.

In a feasible implementation, when sending the first indication information to the terminal device, the network device sends, to the terminal device, downlink control information DCI scrambled by using a radio network temporary identifier (radio network temporary identity, RNTI), where the DCI includes a first field and a second field. After receiving the DCI that includes the first field and the second field, the terminal device determines the first indication information based on the first field and the second field.

For example, a correspondence between the first field, the second field, and the target transmission mode that is indicated by the first indication information may be preconfigured on the terminal device, so that after receiving the DCI, the terminal device may parse the first field and the second field in the DCI, to determine the first indication information and determine the target transmission mode based on the first indication information. For example, the first field is preconfigured as a modulation and coding scheme (MCS) of DCI, and the second field may be a repetition quantity field, a hybrid automatic repeat request process number (hybrid automatic repeat, HARQ process number) field, or the like. An example in which the first field is an MCS, the second field is a repetition quantity field, and the second field is two bits is used. Values of the two bits of the second field may be represented as 00, 01, 10, and 11. When receiving the DCI that includes the first field and the second field, the terminal device first determines whether the entire MCS field is 1, and when all bit values of the MCS field are 1, the terminal device determines the second field. If the values of the two bits of the second field are 00 or 11, it indicates that the target transmission mode is the grant-free retransmission mode. If the values of the two bits of the second field are 01, it indicates that the target transmission mode is the EDT mode. If the values of the two bits of the second field are 10, it indicates that the transmission mode is the first random access mode.

In this embodiment, the network device sends the first indication information including the first field and the second field to the terminal device via the scrambled DCI, so that the terminal device determines the first indication information based on the first field and the second field, and sends the signal to the network device in the target transmission mode indicated by the first indication information, thereby improving the success rate of sending the uplink signal by the terminal device in the non-connected state in the grant-free mode.

In the foregoing embodiment, that all bit values of a field are 1 may be understood as that all the bits of the field are set to 1.

In the foregoing embodiment, the first field includes, for example, the MCS field or the RA field. This is not limited in this embodiment of this application. The second field includes another field other than the first field and a flag that is for distinguishing a control information format, for example, the HARQ process number field and/or the repetition quantity field.

The following describes in detail the RNTI that corresponds when the DCI scrambled by using the RNTI or the PDSCH corresponding to the scrambled DCI carries the first indication information.

In a feasible implementation, the RNTI includes any one of the following RNTIs: a paging radio network temporary identifier P-RNTI, a cell radio network temporary identifier C-RNTI, or a preconfigured resource RNTI.

In this embodiment of this application, the RNTI is, for example, a paging radio network temporary identifier (paging radio network temporary identity, P-RNTI), a cell radio network temporary identifier (cell radio network temporary identity, C-RNTI), or a preconfigured resource RNTI. When the RNTI is a P-RNTI, the first indication information may be carried in, for example, a sixth bit, a seventh bit, or an eighth bit in the DCI, or may be carried in another unused bit. When the RNTI is a C-RNTI, a location for carrying information is not limited in this case. When the RNTI is a preconfigured resource RNTI, the RNTI may be used to scramble DCI used for scheduling or feeding back transmission of preconfigured resource.

It should be noted that although in the foregoing descriptions, the RNTI is the P-RNTI, the C-RNTI, or the preconfigured resource RNTI, this embodiment of this application is not limited thereto. In another feasible implementation, the RNTI may alternatively be another RNTI.

In this embodiment of this application, the DCI is DCI scrambled by using the P-RNTI, the C-RNTI, or the preconfigured resource RNTI, to flexibly scramble the DCI.

The following describes in detail the scrambled DCI that corresponds when the DCI scrambled by using the RNTI or the PDSCH corresponding to the scrambled DCI carries the first indication information.

In a feasible implementation, the DCI is DCI format 6-2 scrambled by a paging radio network temporary identifier P-RNTI, and a flag of the DCI format 6-2 is 0. In this case, the DCI is used for direct indication. Optionally, the first indication information is located in direct indication information in the DCI format 6-2, for example, is indicated by a sixth bit, a seventh bit, or an eighth bit, or may be indicated by another unused bit.

In this embodiment of this application, an unused bit resource in the DCI may be reused, to avoid newly adding signaling.

In the foregoing embodiment, in addition to the target transmission mode, the first indication information further carries at least one of the following information: power information, timing advance (TA) information, or repetition quantity information. After receiving the first indication information sent by the network device, the terminal device may further perform at least one of the following actions: adjusting power based on the power information in the first indication information, adjusting an uplink transmission time based on the TA information, or determining a repetition quantity based on the repetition quantity information.

In this embodiment, the power information, the TA information, the repetition quantity, and the like are carried in the first indication information, to adjust the power, the uplink transmission time, or the repetition quantity of the terminal device.

In the foregoing embodiment, the target transmission mode is the first random access mode or the EDT mode, and before transmitting the signal in the target transmission mode based on the first indication information, the terminal device further receives first information sent by the network device, where the first information is used to indicate a preamble sequence and/or a random access time-frequency resource that are/is used when the terminal device initiates the random access request.

For example, when the success rate of sending the uplink data is low, after determining that the target transmission mode is the first random access mode or the EDT mode, the network device further sends first information to the terminal device. The first information is used to indicate a preamble sequence, a random access time-frequency resource, and the like. Correspondingly, the terminal device receives the first information. Then, the terminal device determines a preamble, a time-frequency resource, and the like based on the first information, and initiates a random access process.

In this embodiment, when the target transmission mode is the first random access mode or the EDT mode, the network device sends, to the terminal device, the first information used to indicate the preamble sequence and the random access time-frequency resource, so that the terminal device determines the preamble sequence and the random access time-frequency resource based on the first information, and initiates the random access process, thereby improving the success rate of sending the uplink signal by the terminal device in the non-connected state in the grant-free mode.

The following describes in detail how the terminal device sends a signal to the network device in the target transmission mode.

In a feasible implementation, the target transmission mode is the first random access mode, and that the terminal device sends a signal to the network device in the target transmission mode includes: receiving, by the terminal device, second indication information sent by the network device, where the second indication information is used to indicate, to the terminal device, a first PRACH resource corresponding to the first random access mode; and initiating a random access process on the first PRACH resource, where the first PRACH resource is used only by the terminal device; or selecting, by the terminal device, a second PRACH resource from a first group of PRACH resources, and initiating a random access process on the second PRACH resource, where the first group of PRACH resources are PRACH resources shared in a cell.

For example, when the target transmission mode is the first random access mode, the network device may configure a random access resource for the terminal device in the following two manners. Manner 1: The network device sends second indication information to the terminal device, where the second indication information is used to indicate a first PRACH resource, and the first PRACH resource is a terminal-device-specific PRACH resource and is used only by the terminal device. Correspondingly, the terminal device receives the second indication information, and initiates a random access process on the first PRACH resource. In the random access process, Msg3 does not carry an uplink signal. Manner 2: A first group of PRACH resources are configured by using the network device, and the first group of PRACH resources are PRACH resources shared in a cell. The terminal device selects a second PRACH resource from the first group of PRACH resources randomly or in another manner, and initiates a random access process on the second PRACH resource. In the random access process, Msg3 does not carry an uplink signal. In other words, the preamble sequence and/or the time-frequency resource that are/is used by the terminal device to send the random access request in the first random access mode may be selected by the terminal device from random access resources configured by the network device, or may be a dedicated preamble sequence and/or time-frequency resource configured by the network device for the terminal device (in other words, the terminal device no longer needs to select, from a plurality of preamble sequences configured by a network device, a preamble sequence and/or a time-frequency resource that need/needs to be used by the terminal device). The preamble sequence and/or the time-frequency resource configured by the network device may also be referred to as a preamble sequence and/or a time-frequency resource in a non-contention-based random access process. Essentially, the preamble sequence is configured by the network device, and is not randomly selected by the terminal device, and a preamble sequence configured by the network device is not shared with another user on a same time-frequency resource.

In this embodiment, when the target transmission mode is the first random access mode, the terminal device initiates the random access process on the specific first PRACH resource configured by the network device or the shared second PRACH resource, to improve the success rate of sending the uplink signal by the terminal device in the non-connected state in the grant-free mode.

In a feasible implementation, the target transmission mode is the EDT mode, and that the terminal device sends a signal to the network device in the target transmission mode includes: receiving, by the terminal device, third indication information sent by the network device, where the third indication information is used to indicate, to the terminal device, a third PRACH resource corresponding to the EDT mode; and initiating a random access process on the third PRACH resource, where the third PRACH resource is used only by the terminal device; or selecting, by the terminal device, a fourth PRACH resource from a second group of PRACH resources, and initiating a random access process on the fourth PRACH resource, where the second group of PRACH resources are shared PRACH resources.

For example, when the target transmission mode is the EDT mode, the network device may configure a random access resource for the terminal device in the following two manners. Manner 1: The network device sends third indication information to the terminal device, where the third indication information is used to indicate a third PRACH resource, and the third PRACH resource is a terminal-device-specific PRACH resource and is used only by the terminal device. Correspondingly, the terminal device receives the third indication information, and initiates a random access process on the third PRACH resource. In the random access process, Msg3 carries an uplink signal. Manner 2: A second group of PRACH resources are configured by using the network device, and the second group of PRACH resources are PRACH resources shared in a cell. The terminal device selects a fourth PRACH resource from the second group of PRACH resources randomly or in another manner, and initiates a random access process on the fourth PRACH resource. In the random access process, Msg3 carries an uplink signal. In other words, the preamble sequence and/or the time-frequency resource that are/is used by the terminal device to initiate the random access request in the EDT mode may be selected by the terminal device from random access resources configured by the network device, or the preamble sequence and/or the time-frequency resource for the EDT mode may be a dedicated preamble sequence and/or time-frequency resource configured by the network device for the terminal device (in other words, the terminal device no longer needs to select, from a plurality of preamble sequences configured by a network device, a preamble sequence and/or a time-frequency resource that need/needs to be used by the terminal device). The preamble sequence and/or the time-frequency resource configured by the network device may also be referred to as a preamble sequence and/or a time-frequency resource in a non-contention-based random access process. Essentially, the preamble sequence is configured by the network device, and is not randomly selected by the terminal device, and a preamble sequence configured by the network device is not shared with another user on a same time-frequency resource.

In this embodiment, when the target transmission mode is the EDT mode, the terminal device initiates the random access process on the specific third PRACH resource configured by the network device or the shared fourth PRACH resource, to improve the success rate of sending the uplink signal by the terminal device in the non-connected state in the grant-free mode.

It can be learned from the foregoing descriptions that when the target transmission mode is the first random access mode or the early data transmission mode, the preamble sequence used by the terminal device to initiate the random access process may be selected by the terminal device from the random access resources configured by the network device, or may be a dedicated preamble sequence configured by the network device for the terminal device. When the current preamble sequence is a preamble sequence configured by the network device, the preamble sequence may also be referred to as a preamble sequence in a non-contention-based random access process. Essentially, the preamble sequence is configured by the network device for the terminal device, and is not randomly selected by the terminal device, and a preamble sequence configured by the network device is not shared with another user on a same time-frequency resource. Therefore, different users can be distinguished between. The network device allocates a preamble sequence to the terminal device for non-contention-based access, so that the terminal device can quickly complete random access.

Figure 3:
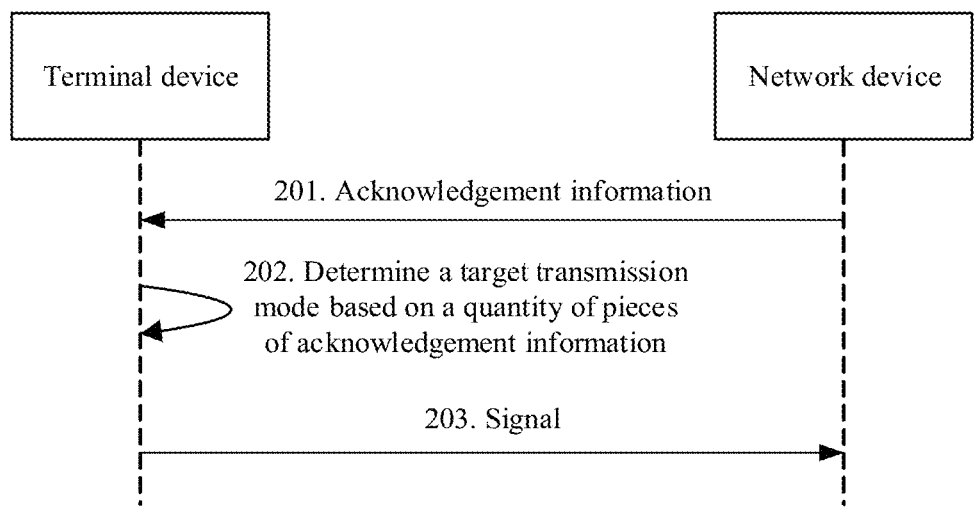
FIG. 3 shows another signal transmission method according to an embodiment of this application.

FIG. 3 shows another signal transmission method according to an embodiment of this application. Compared with FIG. 2 in which a target transmission mode is explicitly indicated, in this embodiment, the terminal device determines the target transmission mode in an implicit manner. This embodiment includes the following steps.

201. A network device sends acknowledgement information to a terminal device.

In this embodiment of this application, after sending a signal to the network device, the terminal device receives the acknowledgement information sent by the network device.

For example, the network device sends acknowledgement (ACK) information and negative acknowledgement (NACK) information. In this case, if the network device correctly decodes the received signal, the network device sends ACK information to the terminal device, and correspondingly, the terminal device receives the ACK information. If the network device does not correctly receive the signal, the network device sends NACK information to the terminal device, and correspondingly, the terminal device receives the NACK information. In this case, for the terminal device, after the signal is sent, a quantity of pieces of acknowledgement information corresponding to the signal is fixed, and the acknowledgement information includes ACK information and NACK information.

For another example, the network device sends only ACK information. In this case, if the network device correctly receives the signal, the network device sends ACK information to the terminal device, and correspondingly, the terminal device receives the ACK information. If the network device does not correctly receive the signal, the network device does not send any information. In this case, for the terminal device, after the signal is sent, if the network device correctly receives all signals, a quantity of pieces of ACK information received by the terminal device is fixed.

For still another example, the network device sends only NACK information. In this case, if the network device correctly receives the signal, the network device does not send any information. If the network device does not correctly receive the signal, the network device sends NACK information, and correspondingly, the terminal device receives the NACK information. In this case, for the terminal device, after the signal is sent, if the network device does not correctly receive all signals, a quantity of pieces of NACK information received by the terminal device is fixed.

202. The terminal device determines a target transmission mode based on a quantity of pieces of acknowledgement information, where the target transmission mode includes any one of the following modes: a first random access mode, an early data transmission EDT mode, or a grant-free retransmission mode.

In this step, the terminal device determines the target transmission mode based on the quantity of pieces of acknowledgement information. For example, when the network device sends only ACK information, if a quantity of pieces of ACK information received by the terminal device is greater than a preset threshold, the terminal device determines that the target transmission mode is the grant-free retransmission mode. For another example, when the network device sends only a NACK, if a quantity of pieces of NACK information received by the terminal device is greater than a preset threshold, the terminal device determines that the target transmission mode is the EDT mode or the first random access mode. The preset threshold is, for example, 1, in other words, the terminal device receives a NACK once at most, and then the terminal device determines the target transmission mode. It may be understood that the preset threshold is 1. To be specific, within a period of time, if the terminal device receives a NACK once, or does not receive an ACK, or does not receive uplink scheduling information, the terminal device determines the target transmission mode.

203. The terminal device sends a signal to the network device in the target transmission mode.

For example, reference may be made to the descriptions of step 102 in FIG. 2, and details are not described herein again.

According to the signal transmission method provided in this embodiment of this application, when finding that decoding of an uplink signal fails or a quantity of failures reaches a predetermined threshold, the terminal device determines the target transmission mode based on the acknowledgement information, and sends the signal to the network device in the target transmission mode. In this process, the terminal device determines the target transmission mode based on the quantity of pieces of acknowledgement information, so that an uplink transmission mode can be adjusted in time, to avoid excessive scheduling or an increase in a transmission failure rate.

In the foregoing embodiment, the acknowledgement information in step 101 is negative acknowledgement information received by the terminal device or acknowledgement information not received by the terminal device.

For example, in a scenario in which the network device sends only NACK information, the foregoing acknowledgement information is NACK information received by the terminal device. In a scenario in which the network device sends only ACK information, the foregoing acknowledgement information is ACK information received by the terminal device. In a scenario in which the network device sends the NACK information and the ACK information, the foregoing acknowledgement information is NACK information received by the terminal device.

In this embodiment, the acknowledgement information is flexibly set, so that the terminal device can determine the target transmission mode for different scenarios.

The following describes in detail how the terminal device determines the target transmission mode based on the quantity of pieces of acknowledgement information.

In a feasible implementation, that the terminal device determines a target transmission mode based on a quantity of pieces of acknowledgement information includes: determining, by the terminal device, whether the quantity of acknowledgement messages is less than or equal to a preset threshold; and if the quantity is less than or equal to the preset threshold, determining, by the terminal device, that the target transmission mode is the grant-free retransmission mode.

For example, in a scenario in which the network device sends only NACK information, when the terminal device determines that the quantity of pieces of received NACK information is less than or equal to a preset threshold, the terminal device determines that the target transmission mode is the grant-free retransmission mode. In a scenario in which the network device sends only ACK information, when the terminal device determines that a quantity of pieces of ACK information not received is less than or equal to a preset threshold, the terminal device determines that the target transmission mode is the grant-free retransmission mode. In a scenario in which the network device sends the NACK information and the ACK information, when the terminal device determines that the quantity of pieces of received NACK information is less than or equal to a preset threshold, the terminal device determines that the target transmission mode is the grant-free retransmission mode. It can be learned that when the quantity of pieces of NACK information received by the terminal device or the quantity of pieces of ACK information not received by the terminal device is less than or equal to a preset threshold, it indicates that a success rate of sending a signal by the terminal device is relatively high, and the power and the like of the terminal device may be adjusted, so that the grant-free retransmission mode is used to improve the success rate of sending the signal.

In this embodiment, when the quantity of pieces of NACK information received by the terminal device or the quantity of pieces of ACK information not received by the terminal device is less than or equal to the preset threshold, the terminal device sends the signal in the grant-free retransmission mode, to improve the success rate of sending the uplink signal by the terminal device in a non-connected state in the grant-free mode.

In a feasible implementation, that the terminal device determines a target transmission mode based on a quantity of pieces of acknowledgement information includes: if the quantity is greater than the preset threshold, reading, by the terminal device, fourth indication information in RRC configuration information, where the fourth indication information is used to indicate that the target transmission mode is the first random access mode or the EDT mode; and determining, by the terminal device, the target transmission mode based on the fourth indication information.

For example, when the quantity of pieces of NACK information received by the terminal device or the quantity of pieces of ACK information not received by the terminal device is greater than the preset threshold, it indicates that the success rate of sending the signal by the terminal device is relatively low, and the success rate of sending the uplink signal cannot be improved by adjusting the power of the terminal device. In this case, the terminal device determines the target transmission mode based on the fourth indication information configured by the network device. The fourth indication information is used to indicate the terminal device to fall back to the EDT mode or the first random access mode. For example, the fourth indication information is 1-bit information, 1 indicates that the target transmission mode is the EDT mode, and 0 indicates that the target transmission mode is the first random access mode. Optionally, the fourth indication information is carried in an RRC message stored by a user, and the RRC information is determined by the terminal device when the terminal device is in a connected state. In other words, when the terminal device is in the connected state, the terminal device determines and retains the RRC information. When the terminal device switches from the connected state to the non-connected state, the terminal device retains the RRC information.

In this embodiment, when the quantity of pieces of NACK information received by the terminal device or the quantity of pieces of ACK information not received by the terminal device is greater than the preset threshold, the terminal device determines the target transmission mode based on the fourth indication information in the RRC configuration information, to improve the success rate of sending the uplink signal by the terminal device in the non-connected state in the grant-free mode.

In a feasible implementation, that the terminal device determines a target transmission mode based on a quantity of pieces of acknowledgement information includes: if the quantity is greater than the preset threshold, determining, by the terminal device based on first information, that the target transmission mode is the first random access mode or the EDT mode, where the first information is an identity and/or a time-frequency resource of the terminal device.

For example, when the quantity of pieces of NACK information received by the terminal device or the quantity of pieces of ACK information not received by the terminal device is greater than the preset threshold, it indicates that the success rate of sending the signal by the terminal device is relatively low, and the success rate of sending the uplink signal cannot be improved by adjusting the power of the terminal device. In this case, the terminal device determines the target transmission mode based on the identity, namely, a UE-ID, and/or the time-frequency resource. For example, when the UE-ID is an odd number, the terminal device determines that the target transmission mode is the EDT mode; or when the UE-ID is an even number, the terminal device determines that the target transmission mode is the first random access mode. For another example, when the time-frequency resource occupies an odd quantity of symbols in time domain, the terminal device determines that the target transmission mode is the first random access mode. When the time-frequency resource occupies an even quantity of symbols in time domain, the terminal device determines that the target transmission mode is the EDT mode.

In this embodiment, when the quantity of pieces of NACK information received by the terminal device or the quantity of pieces of ACK information not received by the terminal device is greater than the preset threshold, the terminal device determines the target transmission mode based on the identity and/or the time-frequency resource, to improve the success rate of sending the uplink signal by the terminal device in the non-connected state in the grant-free mode.

In the foregoing embodiment, the target transmission mode is the first random access mode or the EDT mode, and before sending the signal to the network device in the target transmission mode, the terminal device further receives first information sent by the network device, where the first information is used to indicate a preamble, and the preamble includes at least one of the following information: a time-frequency resource used to send the preamble, a preamble sequence, a number of the preamble sequence, a random access sequence, or a number of the random access sequence.

For example, when the success rate of sending the uplink data is low, after determining that the target transmission mode is the first random access mode or the EDT mode, the network device further sends first information to the terminal device, where the first information is used to indicate a preamble, and the preamble includes at least one of the following information: a time-frequency resource used to send the preamble, a preamble sequence, a number of the preamble sequence, a random access sequence, or a number of the random access sequence. Correspondingly, the terminal device receives the first information. Then, a random access process corresponding to the first random access mode or the EDT mode is initiated based on the first information.

In this embodiment, when the target transmission mode is the first random access mode or the EDT mode, the network device sends the first information to the terminal device, where the first information is used to indicate the preamble, and the preamble includes at least one of the following information: the time-frequency resource used to send the preamble, the preamble sequence, the number of the preamble sequence, the random access sequence, or the number of the random access sequence, so that the terminal device initiates the random access process based on the first information, thereby improving the success rate of sending the uplink signal by the terminal device in the non-connected state in the grant-free mode.

It should be noted that, in FIG. 2 and the optional embodiments thereof, the first indication information is used to indicate the terminal device to send the signal in the target transmission mode, and the target transmission mode is any one of the first random access mode, the EDT mode, or the grant-free retransmission mode. However, this embodiment of this application is not limited thereto. In another feasible implementation, the network device sends fifth indication information to the terminal device, where the fifth indication information indicates the terminal device to send a signal in the target transmission mode, the target transmission mode includes any one of the following modes: a first manner or the grant-free retransmission mode, and the first manner is either of the first random access mode and the early data transmission EDT mode. The first random access mode includes a contention-based random access mode or a non-contention-based random access mode. A message Msg3 in the contention-based random access mode does not carry uplink data, and Msg3 in the EDT transmission mode carries uplink data. After receiving the fifth indication information, the terminal device determines the target transmission mode based on the fifth indication information, and sends a signal to the network device in the target transmission mode.

In a feasible implementation, when the fifth indication information indicates the first mode, when determining the target transmission mode based on the fifth indication information, the terminal device randomly selects a transmission mode from the first random access mode and the EDT mode as the target transmission mode. When the fifth indication information indicates the grant-free retransmission mode, the terminal device determines that the target transmission mode is the grant-free retransmission mode, and sends the uplink data to the network device in the grant-free retransmission mode.

Figure 4:
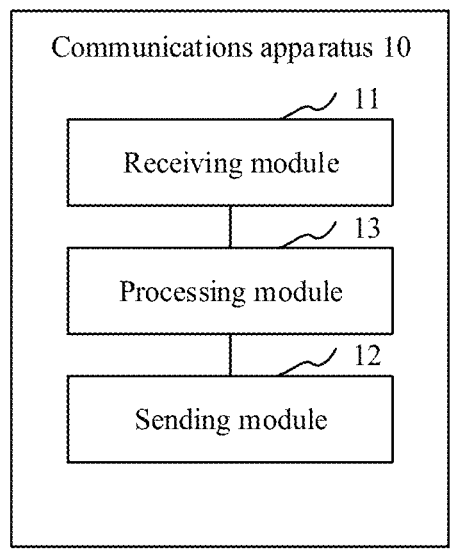
FIG. 4 is a schematic structural diagram of a communications apparatus according to an embodiment of this application.

FIG. 4 is a schematic structural diagram of a communications apparatus according to an embodiment of this application. The communications apparatus in this embodiment may be a terminal device, or may be a chip used in a terminal device. The communications apparatus may be configured to perform a function of the terminal device in the method embodiment shown in FIG. 2. As shown in FIG. 4, the communications apparatus 10 may include a receiving module 11 and a sending module 12. The receiving module 11 is configured to receive first indication information sent by a network device, where the first indication information is used to indicate the terminal device to send a signal in a target transmission mode, and the target transmission mode includes any one of the following modes: a first random access mode, an early data transmission EDT mode, or a grant-free retransmission mode, where the first random access mode includes a contention-based random access mode or a non-contention-based random access mode, a message Msg3 in the first random access mode does not carry uplink data, and Msg3 in the EDT transmission mode carries uplink data.

The sending module 12 is configured to send a signal to the network device in the target transmission mode indicated by the first indication information received by the receiving module 11.

In a feasible design, the receiving module 11 is configured to receive a paging message sent by the network device, where the paging message carries the first indication information. In a feasible design, the receiving module 11 is configured to receive downlink control information DCI that is sent by the network device and that is scrambled by using a radio network temporary identifier RNTI, where the DCI carries the first indication information; or the receiving module 11 is configured to: receive DCI that is sent by the network device and that is scrambled by using an RNTI, and receive a physical downlink shared channel PDSCH based on the DCI, where the PDSCH carries the first indication information.

In a feasible design, the RNTI includes any one of the following RNTIs: a paging radio network temporary identifier P-RNTI, a cell radio network temporary identifier C-RNTI, or a preconfigured resource RNTI.

In a feasible design, the DCI is DCI format 6-2 scrambled by a paging radio network temporary identifier P-RNTI, and a flag of the DCI format 6-2 is 0.

In a feasible design, the terminal device further includes a processing module 13.

The receiving module 11 is configured to receive downlink control information DCI that is sent by the network device and that is scrambled by using a radio network temporary identifier RNTI, where the DCI includes a first field.

The processing module 13 is further configured to determine the first indication information based on the first field.

In a feasible design, the terminal device is a terminal device in a coverage enhancement mode B CE mode B, a terminal device at a coverage enhancement level 2 CE level 2, or a terminal device at a coverage enhancement level CE level 3, the DCI is DCI format 6-0B, and the first field is a modulation and coding scheme MCS field in the DCI; and all bit values of the MCS field are 1, and the target transmission mode indicated by the first indication information is the grant-free retransmission mode; or not all bit values of the MCS field are 1, and the target transmission mode is either of the first random access mode and the EDT retransmission mode. It should be noted that when the transmission mode further includes a grant-based retransmission mode, not all bit values of the MCS field are 1, and the target transmission mode is any one of the first random access mode, the EDT mode, or the grant-based retransmission mode.

Alternatively, the terminal device is a terminal device in a coverage enhancement mode A CE mode A, a terminal device at a coverage enhancement level 0 CE level 0, or a terminal device at a coverage enhancement level 1 CE level 1, the DCI is DCI format 6-0A, and the first field is a resource block assignment RA field in the DCI; and all bit values of the RA field are 1, and the target transmission mode indicated by the first indication information is the grant-free retransmission mode; or not all bit values of the RA field are 1, and the target transmission mode is either of the first random access mode and the EDT retransmission mode.

It should be noted that when the transmission mode further includes a grant-based retransmission mode, not all bit values of the RA field are 1, and the target transmission mode is any one of the first random access mode, the EDT mode, or the grant-based retransmission mode.

Alternatively, the terminal device is a terminal device in a coverage enhancement mode A CE mode A, a terminal device at a coverage enhancement level 0 CE level 0, or a terminal device at a coverage enhancement level 1 CE level 1, the DCI is DCI format 6-1A, and the first field is a resource block assignment RA field in the DCI; and all bit values of the RA field are 1, and the target transmission mode indicated by the first indication information is the grant-free retransmission mode; or not all bit values of the RA field are 1, and the target transmission mode is either of the first random access mode and the EDT retransmission mode. It should be noted that when the transmission mode further includes a grant-based retransmission mode, not all bit values of the RA field are 1, and the target transmission mode is any one of the first random access mode, the EDT mode, or the grant-based retransmission mode.

Alternatively, the terminal device is a terminal device in a coverage enhancement mode B CE mode B, a terminal device at a coverage enhancement level 2 CE level 2, or a terminal device at a coverage enhancement level CE level 3, the DCI is DCI format 6-1B, and the first field is a resource block assignment RA field in the DCI; and all bit values of the RA field are 1, and the target transmission mode indicated by the first indication information is the grant-free retransmission mode; or not all bit values of the RA field are 1, and the target transmission mode is either of the first random access mode and the EDT retransmission mode. It should be noted that when the transmission mode further includes a grant-based retransmission mode, not all bit values of the RA field are 1, and the target transmission mode is any one of the first random access mode, the EDT mode, or the grant-based retransmission mode.

Alternatively, the first field is a new data indicator NDI field in the DCI; and a bit value of the NDI field is 0, the target transmission mode is the first random access mode or the EDT mode; or a bit value of the NDI field is 1, and the target transmission mode is the grant-free retransmission mode.

In a feasible design, when the target transmission mode is the grant-free retransmission mode, the sending module 12 is configured to send the signal to the network device by using all or a part of a preconfigured resource, where the preconfigured resource is a resource preconfigured by the network device for the terminal device.

In a feasible design, the first indication information further includes at least one of the following information: power information, timing advance TA information, or repetition quantity information; the terminal device further includes a processing module 13; and after the receiving module 11 receives the first indication information sent by the network device, the processing module 13 is configured to adjust power based on the power information in the first indication information, adjust an uplink transmission time based on the TA information, or determine a repetition quantity based on the repetition quantity information.

In a feasible design, the target transmission mode is the first random access mode or the EDT mode, and before the sending module 12 transmits the signal in the target transmission mode based on the first indication information, the receiving module 11 is further configured to receive first information sent by the network device, where the first information is used to indicate a preamble, and the preamble includes at least one of the following information: a time-frequency resource used to send the preamble, a preamble sequence, a number of the preamble sequence, a random access sequence, or a number of the random access sequence.

In a feasible design, the target transmission mode is the first random access mode, and the receiving module 11 is further configured to receive second indication information sent by the network device, where the second indication information is used to indicate, to the terminal device, a first PRACH resource corresponding to the first random access mode; and the sending module 12 initiates a random access process on the first PRACH resource, where the first PRACH resource is used only by the terminal device. Alternatively, the processing module 13 selects a second PRACH resource from a first group of PRACH resources, and the sending module 12 initiates a random access process on the second PRACH resource selected by the processing module 13, where the first group of PRACH resources are shared PRACH resources, and the first group of PRACH resources include at least one second PRACH resource.

In a feasible design, the target transmission mode is the EDT mode, the receiving module 11 is further configured to receive third indication information sent by the network device, the third indication information is used to indicate, to the terminal device, a third PRACH resource corresponding to the EDT mode, the sending module is configured to initiate a random access process on the third PRACH resource, and the third PRACH resource is used only by the terminal device. Alternatively, the processing module 13 is configured to select a fourth PRACH resource from a second group of PRACH resources, the sending module 12 initiates a random access process on the fourth PRACH resource, and the second group of PRACH resources are shared PRACH resources.

The communications apparatus provided in this embodiment of this application may perform an action of the terminal device in FIG. 2 and the optional embodiments. An implementation principle and a technical effect of the communications apparatus are similar to those of the terminal device. Details are not described herein again.

Figure 5:
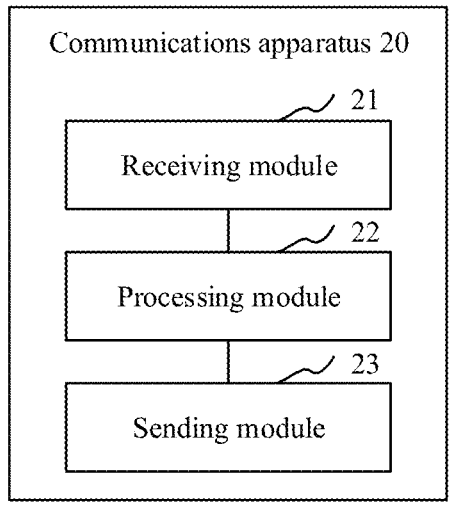
FIG. 5 is a schematic structural diagram of a communications apparatus according to an embodiment of this application.

FIG. 5 is a schematic structural diagram of a communications apparatus according to an embodiment of this application. The communications apparatus in this embodiment may be a network device, or may be a chip used in a network device. The communications apparatus may be configured to perform a function of the network device in the method embodiment shown in FIG. 2. As shown in FIG. 5, the communications apparatus 20 may include a processing module 21, a sending module 22, and a receiving module 23. The processing module 21 is configured to determine a target transmission mode, where the target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data.

The sending module 22 is configured to send first indication information to a terminal device, where the first indication information is used to indicate the terminal device to send a signal in the target transmission mode.

The receiving module 23 is configured to receive a signal sent by the terminal device in the target transmission mode.

In a feasible design, the sending module 22 is configured to send a paging message to the terminal device, where the paging message carries the first indication information.

In a feasible design, the sending module 22 is configured to send downlink control information DCI scrambled by using a radio network temporary identifier RNTI to the terminal device, where the DCI carries the first indication information; or send downlink control information DCI scrambled by using a radio network temporary identifier RNTI to the terminal device, and send a physical downlink shared channel PDSCH based on the DCI, where the PDSCH carries the first indication information.

In a feasible design, the RNTI includes any one of the following RNTIs: a paging radio network temporary identifier P-RNTI, a cell radio network temporary identifier C-RNTI, or a preconfigured resource RNTI.

In a feasible design, the DCI is DCI format 6-2 scrambled by a paging radio network temporary identifier P-RNTI, and a flag of the DCI format 6-2 is 0.

In a feasible design, the sending module 22 is configured to send downlink control information DCI scrambled by using a radio network temporary identifier RNTI to the terminal device, where the DCI includes a first field, and the first field is used to determine the first indication information.

In a feasible design, the sending module 22 is configured to send downlink control information DCI scrambled by using a radio network temporary identifier RNTI to the terminal device, where the DCI includes a first field and a second field, and the first field and the second field are used to determine the first indication information.

In a feasible design, the first indication information further includes at least one of the following information: power information, timing advance TA information, or repetition quantity information.

In a feasible design, the target transmission mode is the first random access mode or the EDT mode, and after the sending module 22 sends the first indication information to the terminal device, the sending module 23 is further configured to send first information to the terminal device, where the first information is used to indicate a preamble, and the preamble includes at least one of the following information: a time-frequency resource used to send the preamble, a preamble sequence, a number of the preamble sequence, a random access sequence, or a number of the random access sequence.

In a feasible design, the target transmission mode is the first random access mode, and after sending the first indication information to the terminal device, the sending module 22 is further configured to send second indication information to the terminal device, where the second indication information is used to indicate, to the terminal device, a first PRACH resource corresponding to the first random access mode, and the first PRACH resource is used only by the terminal device. Alternatively, the processing module 21 is further configured to configure a first group of PRACH resources for the terminal device, the first group of PRACH resources are shared PRACH resources, and the first group of PRACH resources include at least one second PRACH resource.

In a feasible design, the target transmission mode is the EDT mode, and after sending the first indication information to the terminal device, the sending module 22 is further configured to send third indication information to the terminal device, where the third indication information is used to indicate, to the terminal device, a third PRACH resource corresponding to the EDT mode, and the third PRACH resource is used only by the terminal device. Alternatively, the processing module 21 is further configured to configure a second group of PRACH resources for the terminal device, the second group of PRACH resources are shared PRACH resources, and the second group of PRACH resources include at least one fourth PRACH resource.

In a feasible design, when the target transmission mode is the grant-free retransmission mode, the receiving module 23 is configured to receive the signal that is sent by the terminal device to the network device in the grant-free retransmission mode by using all or a part of a preconfigured resource, where the preconfigured resource is a resource preconfigured by the network device for the terminal device.

The communications apparatus provided in this embodiment of this application may perform an action of the network device in FIG. 2 and the optional embodiments. An implementation principle and a technical effect of the communications apparatus are similar to those of the network device. Details are not described herein again.

Figure 6:
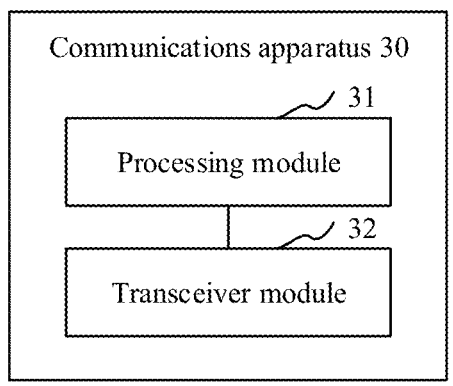
FIG. 6 is a schematic structural diagram of a communications apparatus according to an embodiment of this application.

FIG. 6 is a schematic structural diagram of a communications apparatus according to an embodiment of this application. The communications apparatus in this embodiment may be a terminal device, or may be a chip used in a terminal device. The communications apparatus may be configured to perform a function of the terminal device in the method embodiment shown in FIG. 3. As shown in FIG. 6, the communications apparatus 30 may include a processing module 31 and a transceiver module 32. The processing module 31 is configured to determine a target transmission mode based on a quantity of pieces of acknowledgement information, where the target transmission mode includes any one of the following modes: a first random access mode, an early data transmission EDT mode, or a grant-free retransmission mode, where the first random access mode includes a contention-based random access mode or a non-contention-based random access mode, a message Msg3 in the first random access mode does not carry uplink data, and Msg3 in the EDT transmission mode carries uplink data.

The transceiver module 32 is configured to send a signal to the network device in the target transmission mode.

In a feasible design, the processing module 31 is configured to determine whether the quantity of acknowledgement messages is less than or equal to a preset threshold; and if the quantity is less than or equal to the preset threshold, determine that the target transmission mode is the grant-free retransmission mode.

In a feasible design, if the quantity is greater than the preset threshold, the processing module 31 is further configured to: read fourth indication information from radio resource control RRC configuration information, where the fourth indication information is used to indicate that the target transmission mode is the first random access mode or the EDT mode; and determine the target transmission mode based on the fourth indication information. In a feasible design, the processing module 31 is configured to: if the quantity is greater than the preset threshold, determine, based on first information, that the target transmission mode is the first random access mode or the EDT mode, where the first information is an identity and/or a time-frequency resource of the terminal device.

In a feasible design, the target transmission mode is the first random access mode, and before transmitting the signal in the target transmission mode based on the first indication information, the transceiver module 32 is further configured to receive first information sent by the network device, where the first information is used to indicate a preamble, and the preamble includes at least one of the following information: a time-frequency resource used to send the preamble, a preamble sequence, a number of the preamble sequence, a random access sequence, or a number of the random access sequence.

In a feasible design, the acknowledgement information is negative acknowledgement information received by the terminal device or acknowledgement information not received by the terminal device.

The communications apparatus provided in this embodiment of this application may perform an action of the terminal device in FIG. 3 and the optional embodiments. An implementation principle and a technical effect of the communications apparatus are similar to those of the terminal device. Details are not described herein again.

Figure 7:
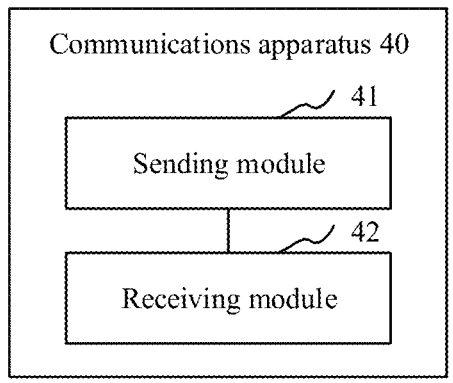
FIG. 7 is a schematic structural diagram of a communications apparatus according to an embodiment of this application.

FIG. 7 is a schematic structural diagram of a communications apparatus according to an embodiment of this application. The communications apparatus in this embodiment may be a network device, or may be a chip used in a network device. The communications apparatus may be configured to perform a function of the network device in the method embodiment shown in FIG. 3. As shown in FIG. 7, the communications apparatus 40 may include a sending module 41 and a receiving module 42. The sending module 41 is configured to send acknowledgement information to a terminal device, so that the terminal device determines a target transmission mode based on a quantity of pieces of acknowledgement information, where the target transmission mode includes any one of the following modes: a first random access mode, an early data transmission EDT mode, or a grant-free retransmission mode, where the first random access mode includes a contention-based random access mode or a non-contention-based random access mode, a message Msg3 in the contention-based random access mode does not carry uplink data, and Msg3 in the EDT transmission mode carries uplink data.

The receiving module 42 is configured to receive a signal sent by the terminal device in the target transmission mode.

In a feasible design, the target transmission mode is the first random access mode or the EDT mode, and after sending the acknowledgement information to the terminal device, the sending module 41 further sends first information to the terminal device, where the first information is used to indicate a preamble, and the preamble includes at least one of the following information: a time-frequency resource used to send the preamble, a preamble sequence, a number of the preamble sequence, a random access sequence, or a number of the random access sequence.

The communications apparatus provided in this embodiment of this application may perform an action of the network device in FIG. 3 and the optional embodiments. An implementation principle and a technical effect of the communications apparatus are similar to those of the network device. Details are not described herein again.

It should be noted that it should be understood that the sending module may be a transmitter when being actually implemented, the receiving module may be a receiver when being actually implemented, and the transceiver module may be a transceiver when being actually implemented. The processing module may be implemented in a form of software invoked by a processing element, or may be implemented in a form of hardware. For example, the processing module may be a separately disposed processing element, or may be integrated into a chip of the foregoing apparatus for implementation. In addition, the processing module may alternatively be stored in a memory of the foregoing apparatus in a form of program code, and is invoked by a processing element of the foregoing apparatus to perform a function of the processing module. In addition, all or some of the modules may be integrated together, or may be implemented independently. The processing element described herein may be an integrated circuit with a signal processing capability. In an implementation process, the steps in the method or the modules can be implemented by using a hardware integrated logic circuit in the processing element, or by using instructions in a form of software.

For example, the foregoing modules may be configured as one or more integrated circuits for implementing the foregoing method, such as one or more application-specific integrated circuits (ASIC), one or more microprocessors (digital signal processor, DSP), or one or more field programmable gate arrays (FPGA). For another example, when one of the foregoing modules is implemented in a form of scheduling program code by a processing element, the processing element may be a general-purpose processor, for example, a central processing unit (CPU) or another processor that can invoke the program code. For another example, the modules may be integrated together, and implemented in a form of a system-on-a-chip (SOC).

Figure 8:
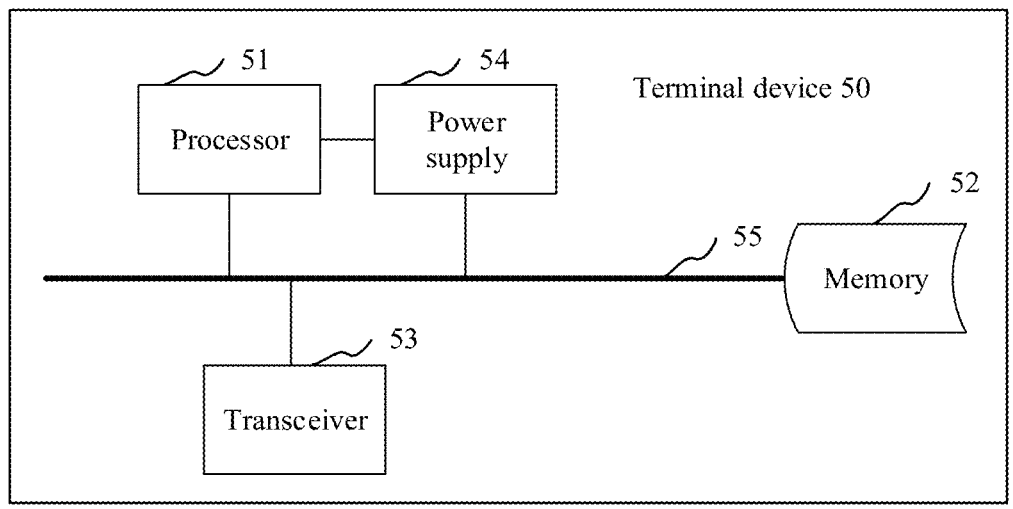
FIG. 8 is a schematic structural diagram of a terminal device according to an embodiment of this application.

FIG. 8 is a schematic structural diagram of a terminal device according to an embodiment of this application. As shown in FIG. 8, the terminal device 50 may include a processor 51 (for example, a CPU), a memory 52, and a transceiver 53. The transceiver 53 is coupled to the processor 51, and the processor 51 controls a sending and receiving action of the transceiver 53. The memory 52 may include a high-speed random access memory (RAM), and may further include a non-volatile memory (NVM), for example, at least one magnetic disk memory. The memory 52 may store various instructions, to complete various processing functions and implement the steps of the method in this application. Optionally, the terminal device in this application may further include a power supply 54 and a communications bus 55. The transceiver 53 may be integrated into a transmitter receiver set of the terminal device, or may be an independent transceiver antenna of the terminal device. The communications bus 55 is configured to implement communication connection between components. The communications bus may be classified into an address bus, a data bus, a control bus, and the like. For ease of representation, only one thick line is used to represent the bus in the figure, but this does not mean that there is only one bus or only one type of bus.

In this embodiment of this application, the memory 52 is configured to store computer-executable program code, and the program code includes an instruction. When the processor 51 executes the instruction, the instruction enables the processor 51 of the terminal device to perform a processing action of the terminal device in the foregoing method embodiment, and enables the transceiver 53 to perform a receiving and sending action of the terminal device in the embodiment shown in FIG. 4 or the optional embodiments.

Implementation principles and technical effects thereof are similar, and details are not described herein again.

Figure 9:
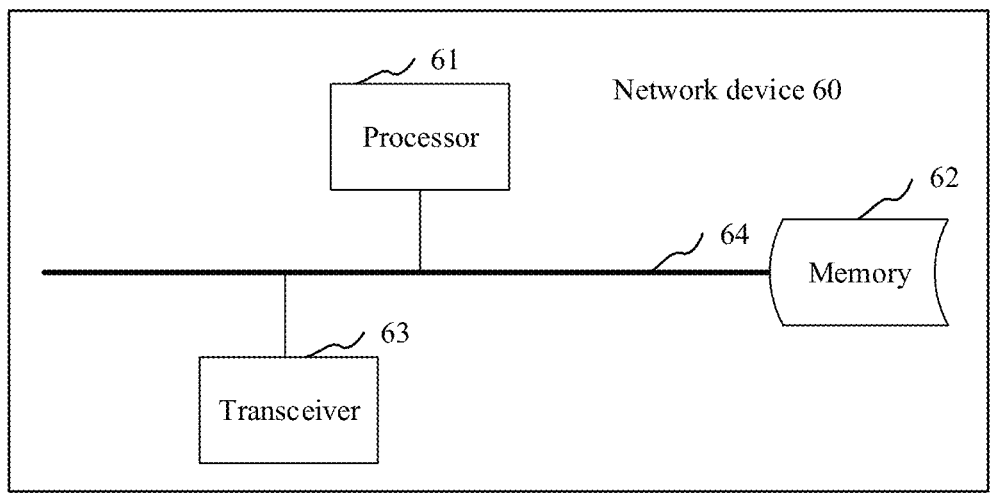
FIG. 9 is a schematic structural diagram of a network device according to an embodiment of this application.

FIG. 9 is a schematic structural diagram of a network device according to an embodiment of this application. As shown in FIG. 9, the network device 60 may include a processor 61 (for example, a CPU), a memory 62, and a transceiver 63. The transceiver 63 is coupled to the processor 61, and the processor 61 controls a sending and receiving action of the transceiver 63. The memory 62 may include a high-speed random access memory (RAM), and may further include a non-volatile memory (NVM), for example, at least one magnetic disk memory. The memory 62 may store various instructions, to complete various processing functions and implement the steps of the method in this application. Optionally, the network device in this application may further include a communications bus 64. The transceiver 63 may be integrated into a transmitter receiver set of the network device, or may be an independent transceiver antenna of the network device. The communications bus 64 is configured to implement communication connection between components. The communications bus may be classified into an address bus, a data bus, a control bus, and the like. For ease of representation, only one thick line is used to represent the bus in the figure, but this does not mean that there is only one bus or only one type of bus.

In this embodiment of this application, the memory 62 is configured to store computer-executable program code, and the program code includes an instruction. When the processor 61 executes the instruction, the instruction enables the processor 61 of the network device to perform a processing action of the network device in the foregoing embodiment or the optional embodiments, and enables the transceiver 63 to perform receiving and sending actions of the network device in the foregoing method embodiment. Implementation principles and technical effects thereof are similar, and details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (Solid State Disk, SSD)), or the like.

The term "a plurality of" in this application refers to two or more than two. The term "and/or" in this specification describes only an association relationship for describing associated objects and represents that three relationships may exist. For example, A and/or B may represent three cases: There is only A, there are both A and B, and there is only B. In addition, the character "/" in this specification usually indicates an "or" relationship between the associated objects. In a formula, the character "/" indicates a "division" relationship between associated objects.

It may be understood that numerical symbols involved in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A signal transmission method comprising:
   receiving, by a terminal device, information from a network device, wherein the information occupies 1 bit and indicates to the terminal device to send a signal in a target transmission mode,
      wherein the target transmission mode includes one or more of the following modes: a random access mode, an early data transmission (EDT) mode, or a grant-free retransmission mode, and
      wherein the information identifies one or two of the random access mode, the EDT mode and the grant-free retransmission mode;
   determining, by the terminal device, transmission of the signal has failed; and
   sending, by the terminal device, the signal to the network device in the target transmission mode identified by the information.

2. The method according to claim 1, wherein the information indicates negative acknowledgement (NACK).

3. The method according to claim 1, wherein the receiving the information comprises:
   receiving, by the terminal device, downlink control information (DCI) that is received from the network device and that is scrambled by using a radio network temporary identifier (RNTI), wherein the DCI carries the information; or
   receiving, by the terminal device, DCI that is received from the network device and that is scrambled by using an RNTI, and receiving a physical downlink shared channel (PDSCH) based on the DCI, wherein the PDSCH carries the information.

4. The method according to claim 3, wherein the RNTI comprises one of the following RNTIs: a paging radio network temporary identifier (P-RNTI), a cell radio network temporary identifier (C-RNTI), or a preconfigured resource RNTI.

5. The method according to claim 1, wherein the first random access mode includes a contention-based random access mode or a non-contention-based random access mode, and wherein a message in the contention-based random access mode does not carry uplink data, and the message in the EDT transmission mode carries uplink data.

6. The method according to claim 1, further comprising:
   adjusting, by the terminal device, power based on power information received from the network device, adjusting an uplink transmission time based on timing advance (TA) information received from the network device, or determining a repetition quantity based on repetition quantity information received from the network device.

7. A signal transmission method comprising:
   determining, by a network device, a target transmission mode after determining that transmission of a signal from a terminal device has failed, wherein the target transmission mode includes one or two of the following modes: a random access mode, an early data transmission (EDT) mode, or a grant-free retransmission mode;

sending, by the network device, information to the terminal device, wherein the information occupies 1 bit and indicates to the terminal device to send the signal in the target transmission mode; and receiving, by the network device, the signal from the terminal device in one of the random access mode, the EDT mode and the random access mode, depending on the information sent to the terminal.

8. The method according to claim 7, wherein the information indicates negative acknowledgement (NACK).

9. The method according to claim 7, wherein the sending the information to the terminal device comprises:

sending, by the network device, downlink control information (DCI) scrambled by using a radio network temporary identifier (RNTI) to the terminal device, wherein the DCI carries the information; or sending, by the network device, DCI scrambled by using a RNTI to the terminal device, and sending a physical downlink shared channel (PDSCH) based on the DCI, wherein the PDSCH carries the information.

10. The method according to claim 9, wherein the RNTI comprises one of the following RNTIs: a paging radio network temporary identifier (P-RNTI), a cell radio network temporary identifier (C-RNTI), or a preconfigured resource RNTI.

11. The method according to claim 7, wherein the first random access mode includes a contention-based random access mode or a non-contention-based random access mode, and wherein a message in the contention-based random access mode does not carry uplink data, and the message in the EDT transmission mode carries uplink data.

12. A communications apparatus comprising:

a processor and a memory storing processor-executable instructions for execution by the processor, wherein the processor-executable instructions, when executed by the processor, cause the apparatus to:

receive information from a network device, wherein the information occupies 1 bit and indicates to a terminal device to send a signal in a target transmission mode, wherein the target transmission mode includes one or more of the following modes: a random access mode, an early data transmission (EDT) mode, or a grant-free retransmission mode, and wherein the information identifies one or two of the random access mode, the EDT mode and the grant-free retransmission mode;

determine that transmission of the signal has failed; and send the signal to the network device in the target transmission mode indicated by the information.

13. The apparatus according to claim 12, wherein the processor-executable instructions further cause the apparatus to:

receive downlink control information (DCI) that is from the network device and that is scrambled by using a radio network temporary identifier (RNTI), wherein the DCI carries the information; or receive DCI that is from the network device and that is scrambled by using an RNTI, and receive a physical downlink shared channel (PDSCH) based on the DCI, wherein the PDSCH carries the information.

14. The apparatus according to claim 13, wherein the RNTI comprises one of the following RNTIs: a paging radio network temporary identifier (P-RNTI), a cell radio network temporary identifier (C-RNTI), or a preconfigured resource (RNTI).

15. The apparatus according to claim 12, wherein the first random access mode includes a contention-based random access mode or a non-contention-based random access mode, and wherein a message in the contention-based random access mode does not carry uplink data, and the message in the EDT transmission mode carries uplink data.

16. The apparatus according to claim 12, wherein the processor-executable instructions further cause the apparatus to: adjust power based on power information in the information, adjust an uplink transmission time based on TA information, or determine a repetition quantity based on the repetition quantity information.

17. A communications apparatus comprising:

a processor and a memory storing processor-executable instructions for execution by the processor, wherein the processor-executable instructions, when executed by the processor, cause the apparatus to:

determine that transmission of a signal from a terminal device has failed;

in response to the determination that the transmission of the signal is failed, determine a target transmission mode, wherein the target transmission mode includes any one of the following modes: a random access mode, an early data transmission (EDT) mode, or a grant-free retransmission mode;

send information to the terminal device, wherein the information occupies 1 bit and indicates to the terminal device to send the signal in the target transmission mode; and receive the signal from the terminal device in one of the random access mode, the EDT mode and the random access mode, depending on the information sent to the terminal.

18. The apparatus according to claim 17, wherein the processor-executable instructions further cause the apparatus to:

send downlink control information (DCI) scrambled by using a radio network temporary identifier (RNTI) to the terminal device, wherein the DCI carries the information; or send DCI scrambled by using a RNTI to the terminal device, and send a physical downlink shared channel (PDSCH) based on the DCI, wherein the PDSCH carries the information.

19. The apparatus according to claim 18, wherein the RNTI comprises one of the following RNTIs: a paging radio network temporary identifier (P-RNTI), a cell radio network temporary identifier (C-RNTI), or a preconfigured resource (RNTI).

20. The apparatus according to claim 17, wherein the first random access mode includes a contention-based random access mode or a non-contention-based random access mode, and wherein a message in the contention-based random access mode does not carry uplink data, and the message in the EDT transmission mode carries uplink data.

* * * * *